US006561448B2

United States Patent
Barker

(10) Patent No.: US 6,561,448 B2
(45) Date of Patent: May 13, 2003

(54) CONVERTIBLE CHASSIS FISHING REEL

(76) Inventor: Craig H. Barker, 220 Ann Cir., #4, Destin, FL (US) 32541

( * ) Notice: Subject to any disclaimer, the term of this patent is extended or adjusted under 35 U.S.C. 154(b) by 0 days.

(21) Appl. No.: 09/906,260

(22) Filed: Jul. 16, 2001

(65) Prior Publication Data

US 2002/0027177 A1 Mar. 7, 2002

Related U.S. Application Data

(60) Provisional application No. 60/304,183, filed on Jul. 14, 2000.

(51) Int. Cl.[7] ............................................... A01K 89/01
(52) U.S. Cl. ........................ 242/229; 242/249; 242/310
(58) Field of Search ................................ 242/229, 249, 242/250, 251, 253, 310, 322, 323, 241; D22/140, 141

(56) References Cited

U.S. PATENT DOCUMENTS

| | | | | |
|---|---|---|---|---|
| 744,454 A | * | 11/1903 | Allen | 242/229 |
| 1,001,195 A | | 8/1911 | Gillette | |
| 2,363,533 A | * | 11/1944 | King | 242/322 |
| 2,439,298 A | | 10/1948 | Horan | |
| 2,589,776 A | * | 3/1952 | Colgrove | 242/229 |
| 2,604,272 A | | 7/1952 | Olsen | |
| 2,612,325 A | * | 9/1952 | Johnson | 242/229 |
| 2,613,046 A | * | 10/1952 | Redding | 242/229 |
| 2,633,307 A | * | 3/1953 | Morgan et al. | 242/229 |
| 2,708,077 A | | 7/1955 | Dalzell et al. | |
| 2,749,057 A | * | 6/1956 | Jenkins et al. | 242/229 |
| 2,941,748 A | * | 6/1960 | Matthiesen | 242/229 |
| 2,973,917 A | * | 3/1961 | Flower | 242/229 |
| 3,039,716 A | * | 6/1962 | Visockis | 242/229 |
| 3,155,340 A | * | 11/1964 | King | 242/229 |
| 3,384,320 A | * | 5/1968 | Hawk | 242/229 |
| D212,945 S | | 12/1968 | Clickner | |
| 3,711,036 A | * | 1/1973 | Spraggins | 242/323 |
| 3,944,159 A | * | 3/1976 | Dobbs | 242/229 |
| 4,106,717 A | * | 8/1978 | Thiel | 242/229 |
| 4,283,025 A | * | 8/1981 | Whisenhunt | 242/249 |
| 4,515,324 A | * | 5/1985 | Barton | 242/250 |
| 4,564,158 A | | 1/1986 | Moosberg et al. | |
| 5,007,601 A | | 4/1991 | Emura et al. | |
| D327,111 S | | 6/1992 | Hemming | |
| D332,992 S | | 2/1993 | Mintz | |
| 5,301,899 A | | 4/1994 | Sato | |
| D410,991 S | | 6/1999 | Miyazaki | |
| 5,911,378 A | | 6/1999 | Plestan | |
| D412,023 S | | 7/1999 | Shields | |

FOREIGN PATENT DOCUMENTS

| | | | | |
|---|---|---|---|---|
| CH | 0257053 | * | 3/1949 | 242/229 |

* cited by examiner

*Primary Examiner*—Emmanuel Marcelo
(74) *Attorney, Agent, or Firm*—Christine Q. McLeod; Beusse, Brownlee, Bowdoin & Wolter

(57) ABSTRACT

The present invention comprises a convertible fishing reel which has a unique design to allow for a more efficient line casting and line retrieval. To accomplish this, a preferred embodiment of the invention comprises two separate components, a main-body chassis and a spool chassis. The spool chassis is connected to at least one support arm of the main-body chassis. The connection is such that the spool chassis can be rotated 90 degrees within the spool chassis, to be perpendicular to the main-body chassis in line casting position and parallel to the main-body chassis in a line retrieval position.

57 Claims, 16 Drawing Sheets

CONVERTIBLE CHASSIS FISHING REEL

CROSS-REFERENCE TO A RELATED APPLICATION

This application claims the benefit of U.S. Provisional Patent Application Ser. No. 60/304,183, filed Jul. 14, 2000.

FIELD OF THE INVENTION

The present invention relates to fishing reels and, more specifically, to a convertible fishing reel where the fishing line may be cast in a manner similar to that of a spinning reel and the fishing line retrieved in a manner similar to that of a conventional reel.

BACKGROUND OF THE INVENTION

Two basic designs encompass the entire spectrum of fishing reels in use today and both have their advantages and their limitations. Traditional "spinning" (or spin-cast) reels are lightweight and designed to hang below the fishing rod for easy casting and handling while "conventional" reels are mounted above the fishing rod and are preferred when casting of the bait is not required.

"Conventional" reel design calls for the axis of the spool (upon which the fishing line is wound) to be perpendicular to the rod upon which the reel is mounted. This enables the spool to revolve freely in a direction parallel to that of line retrieval. This feature is attractive because it eliminates line twist, minimizes the force of friction on the line as it is wound upon the spool, and creates a smooth slip plane that provides a uniform resistive load as a hooked fish pulls line from the reel (this slip plane is hereafter referred to as "drag"). However, this same feature is also its greatest fault because it is necessary to revolve the spool in order to payout line during a cast. In this scenario, casting efficiency is directly dependent upon the weight and momentum of the bait being used. This inconsistency decreases the likelihood that constant line payout will be maintained during a cast. As a result, any slack in the line during a cast ultimately causes the loose line to wind back upon itself resulting in a "bird's-nest" tangle of the line. Furthermore, conventional reels are generally heavier in mass and are mounted on top of the rod. These limitations make cast fishing with conventional tackle extremely cumbersome, especially when trying to cast baits that are of lighter weight.

"Spinning" reels were developed to help alleviate the casting problems inherent with conventional tackle. Spinning reels are designed with a stationary, open-ended spool whose axis is parallel to the fishing rod. During a cast, the line pays out freely from the open end of the spool through the line-guides mounted on the rod. This spool orientation prevents slack in the line as it is paid out during casting effectively eliminating the backlash problem inherent in the use of conventional reels. Furthermore, spinning reels are generally lighter in weight and hang below the rod which makes casting of the bait substantially easier.

Unfortunately, while this design feature did eliminate the problems associated with the casting of conventional tackle, new problems were created. The main drawback to spinning reels is that they rely on an outer wire bail that orbits tangentially (but perpendicular to the direction of line retrieval) about the stationary spool to retrieve the line. Upon retrieval, the line is forced across the wire bail at a 90-degree angle, causing the line to twist and degrade due to the friction-associated heat.

Another major limitation of spinning reels is their inherently poor drag system design. Because the drag mechanism is forced to reside within the relatively small area of the spool housing, the diameter of the drag washers (and therefore the surface area) are severely limited relative to drag washers of conventional tackle. The washers, therefore, become subject to heat expansion during periods of stress, such as when fighting a fish. Furthermore, the drag plane is perpendicular to the direction of line retrieval. This means that when a fish overcomes the force of the drag, the line is pulled across the wire bail at 90-degrees under extreme tension. The resulting friction not only dissipates as heat, thereby quickly degrading the strength of the line, but also results in a drag that is "choppy" and generally much less consistent than the smooth drag preferred by anglers.

A number of patents describe various fishing reels, including U.S. Pat. Nos. 1,001,195 (Gillette), 2,439,298 (Horan), 4,564,158 (Moosberg et al.), 5,007,601 (Emura et al.), 5,301,899 (Sato), and 5,911,378 (Plestan) and herein are incorporated by reference. Moreover, all patents, patent applications, provisional applications, and publications referred to or cited herein, or from which a claim for benefit of priority has been made, are incorporated herein by reference in their entirety to the extent they are not inconsistent with the explicit teachings of this specification.

BRIEF SUMMARY OF THE INVENTION

The present invention remedies the aforementioned problems in the art by providing a convertible fishing reel with a unique design to allow for a more efficient line casting and line retrieval. To accomplish this, a preferred embodiment of the invention comprises two separate components, a main-body chassis and a spool chassis.

The spool chassis is connected to the main-body chassis by a pivot mount. The pivot mount allows the spool chassis to be rotated 90-degrees about a pivot relative to the direction of the fishing rod to which the main-body chassis is attached. The pivot mount can comprise at least one support arm, a pair of support arms, a bell housing, or other similar device that permits pivoting according to the invention. This allows the spool chassis to be positioned perpendicular to the direction of the fishing rod for line casting and parallel to the direction of the fishing rod for line retrieval.

To switch the fishing reel from the line retrieval position to the line casting position, the spool chassis is rotated 90-degrees and locked in position so that the spool chassis is perpendicular to the main-body chassis. As the line is released during a normal cast, the line slips off the front of the open face of the spool, as is common with a spinning reel.

When a cast is completed and the drive mechanism is engaged, the spool chassis automatically rotates 90-degrees in the opposite direction, such that the spool chassis again becomes parallel to the main-body chassis. In this position, the line is retrieved utilizing a method similar to that of conventional reels.

An objective of the subject invention is to eliminate the problems inherent in the design and use of both spinning and conventional fishing reels, while retaining the advantages of both in a single structure.

While two examples of this invention are described and illustrated herein, it should be noted and appreciated that various modifications to the inventive concepts may be apparent and obvious to those skilled in the art without departing from the spirit and scope of the invention.

Accordingly, it is an object of the present invention to provide a fishing reel having a convertible chassis.

It is a further object of the present invention to provide a fishing reel having a convertible chassis rotating between a position perpendicular to the plane of the fishing line to a position parallel to the plane of the fishing line.

It is still a further object of the present invention to provide a fishing reel having a convertible chassis rotatably affixed to at least one support arm.

It is still a further object of the present invention to provide a fishing reel having a convertible chassis rotatably affixed to at least one support arm having a drive means propagating through the pivot point on the support arm.

Further objects and advantages of the present invention will become apparent by reference to the following description of the preferred embodiment and appended drawings.

BRIEF DESCRIPTION OF THE DRAWINGS

The manner by which the above objects, further objects, features, and advantages of the present invention are attained will be fully apparent from the following detailed descriptions of the preferred embodiment, or example, and appended drawings wherein like reference numbers refer to the same element, component, or feature.

DETAILED DESCRIPTION OF THE INVENTION

EXAMPLE 1

Figure 1:
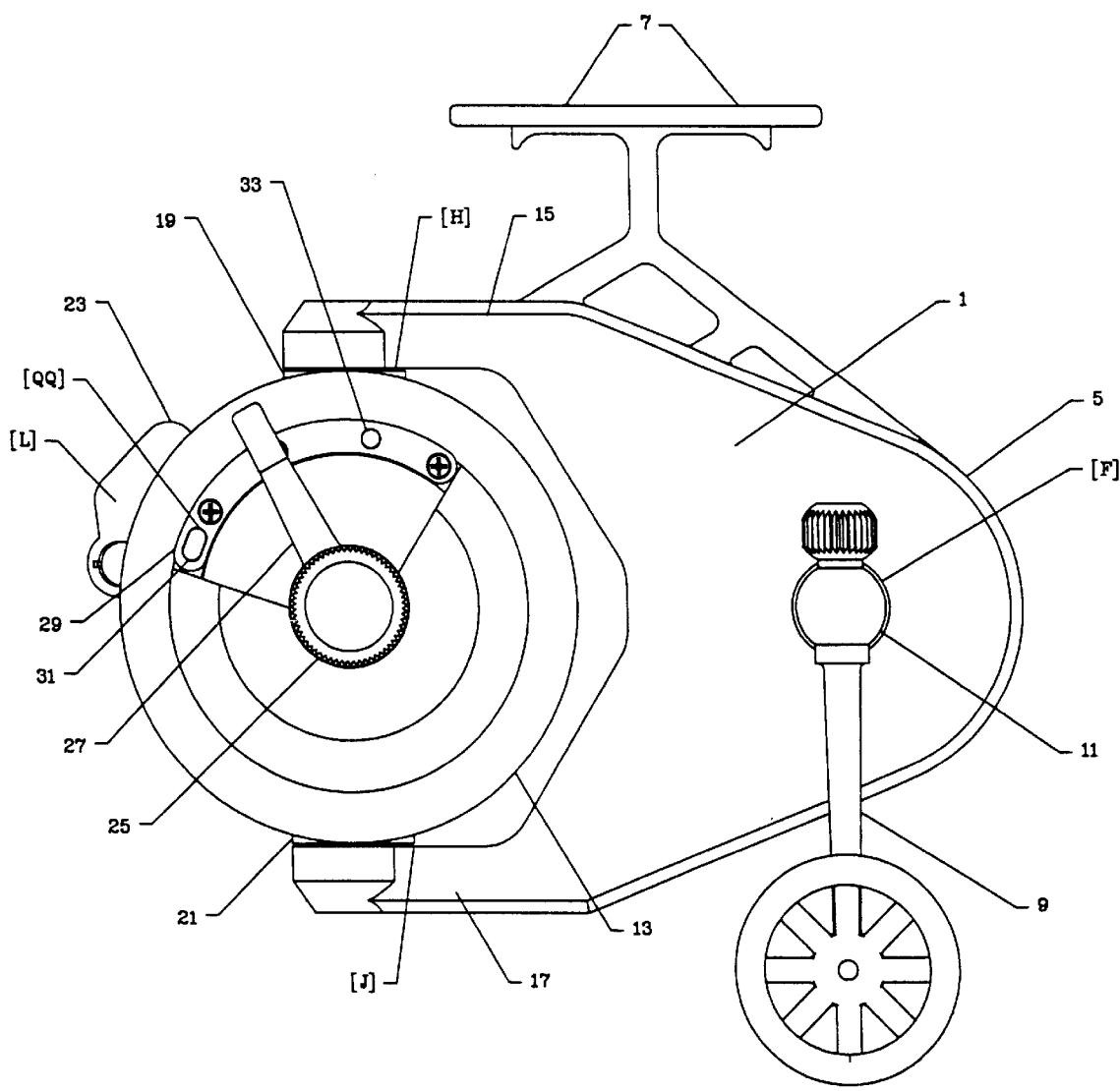
FIG. 1 is a left side view of the reel in line retrieval position of the first example of the present invention.

FIG. 1 depicts the entire reel assembly 1 in the line retrieval position of the first preferred example of the invention. The main-body chassis 5 is constructed of two pieces (the housing and face plate) and designed to be water-resistant. The main-body chassis mount 7 is the foundation upon which the reel 1 is attached to the fishing rod (not shown). The crank handle 9 is connected to the crank assembly 11 portion of the main-body chassis 5 at point F such that it is easily accessible by the angler and free for rotation.

In this application, the plane of the main-body chassis is defined as being substantially parallel to the plane created by the reel's main-body chassis feet, which form the foundation upon which the reel is attached to the fishing rod (not shown). Therefore, this plane is equivalent to the plane of the fishing rod upon which the reel is mounted. The plane of the spool chassis 13 is defined as being substantially perpendicular to the spool chassis's main drive axle which forms the axis of rotation about which the spool mounting mechanism (and therefore the spool) revolve.

As shown in FIG. 1, the spool chassis 13 is connected to the upper and lower drive support arms 15 and 17 of the main-body chassis 5 at connection points H and J. As viewed in FIG. 7, the bodies are connected by vertical pins 87 and 89 that are common to, and transverse both components. The vertical pins 87 and 89 form the axis of rotation about which the spool chassis 13 revolves over a 90-degree arc within the upper and lower drive support arms 15 and 17 of the main-body chassis 5 when the angler wishes to switch from the line retrieval position (of FIG. 1) to the line casting position (of FIG. 2) in order to cast the line. Rubber washers 19 and 21 are positioned at points H and J between the spool chassis 13 and main-body chassis 5 to dampen any frictional forces that may occur as the angler changes the position of the spool chassis 13 when switching from the normal fishing alignment to the casting alignment. The rubber washers 19 and 21 also act as a barrier against the penetration of moisture.

Figure 3:
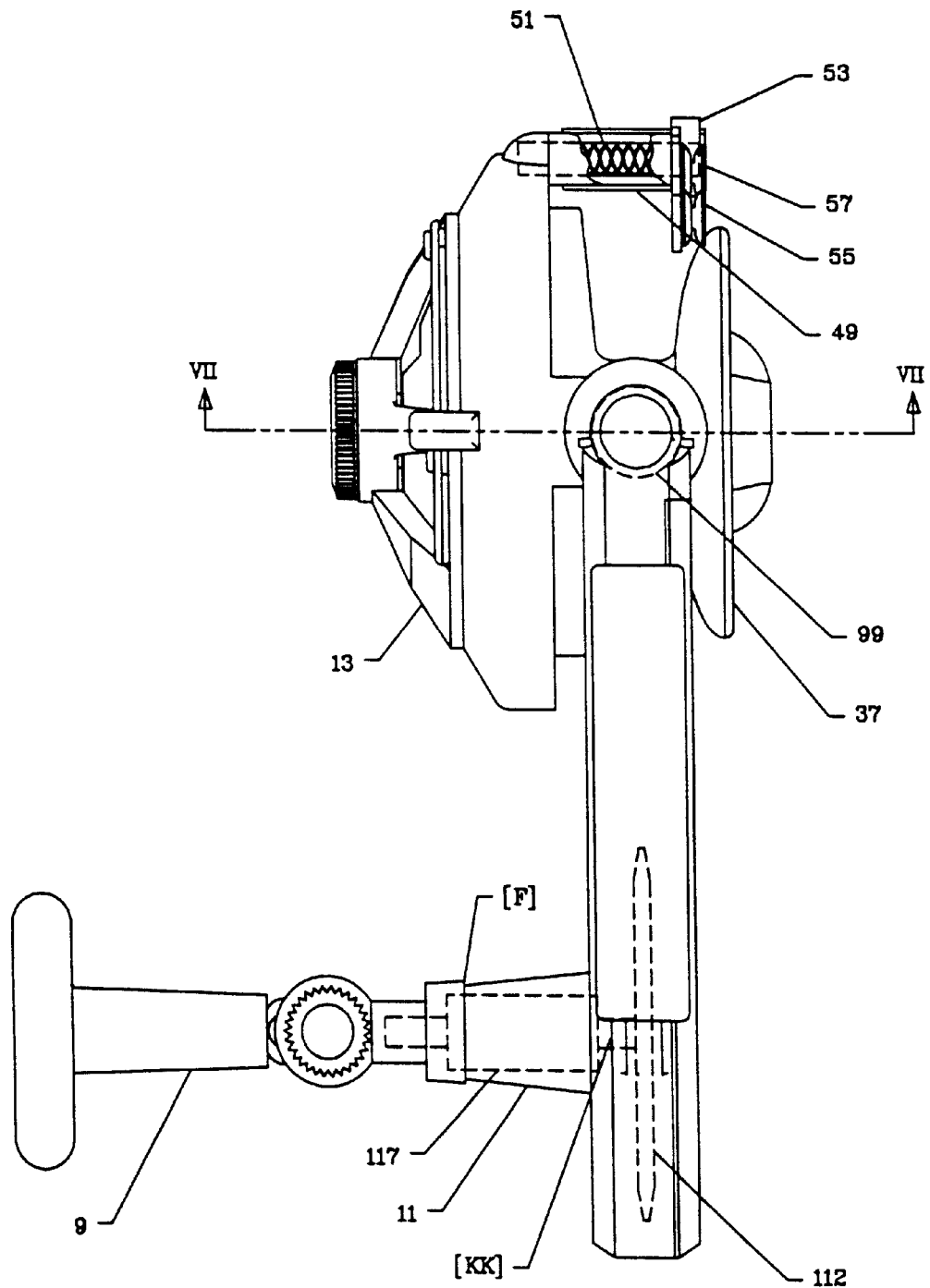
FIG. 3 is a top view of the reel in line retrieval position of the first example of the present invention.

The invention can include a level-wind mechanism. In the first example cited, the level-wind mechanism 23 is an extension of the spool chassis 13, located at position L near the top of the spool chassis 13. As shown in FIG. 3, the level-wind mechanism 23 comprises five inter-working parts including the outer housing 49, the criss-crossed (helical) threaded inner track 51, the drive sled 53, and two small ball bearing line guides 55 and 57 that are attached to the drive sled 53.

As shown in FIG. 1, the drag pre-set knob 25 is positioned at the geographic center of the spool chassis 13 and mounted onto the end of the drag rod 59. As best viewed in FIG. 7, the drag rod 59 is a threaded member that traverses the drag pre-set knob 25, the lever drag arm 27, the spool chassis 13, the helical gear 63 of the main drive gear assembly 62, the spool chassis' 13 main drive axle 45, and the spool mount mechanism 35.

Drag rod 59 bisects the lever drag arm 27 such that the lever arm 27 is free to revolve about an axis of rotation that is positioned at the center of the spool chassis 13. The plane of the drag rod 59 is normal to that of the lever drag arm 27, ensuring that the lever drag arm 27 remains equidistant from the spool chassis 13 as it is pushed through its entire range of motion. An arch-shaped flange bracket 29 is mounted near the top of the spool chassis 13. The flange bracket 29 interleaves within a groove in the lever drag arm 27 (Position N in FIG. 2) and helps support the lever drag arm 27 at the top of the spool chassis 13. The top of the flange bracket 29 may possess raised ridges or teeth that will create a "ratcheting" effect as the lever drag arm 27 is adjusted throughout its entire range of motion. Two independent push-buttons 31 and 33 protrude out of the spool chassis 13 and through the flange bracket 29. Each push-button 31 and 33 houses an internal spring that provides counter resistance when the push-button 31 and 33 is depressed. The push buttons 31 and 33 are positioned in such a manner as to restrict the range of motion of the lever drag arm 27.

Figure 7:
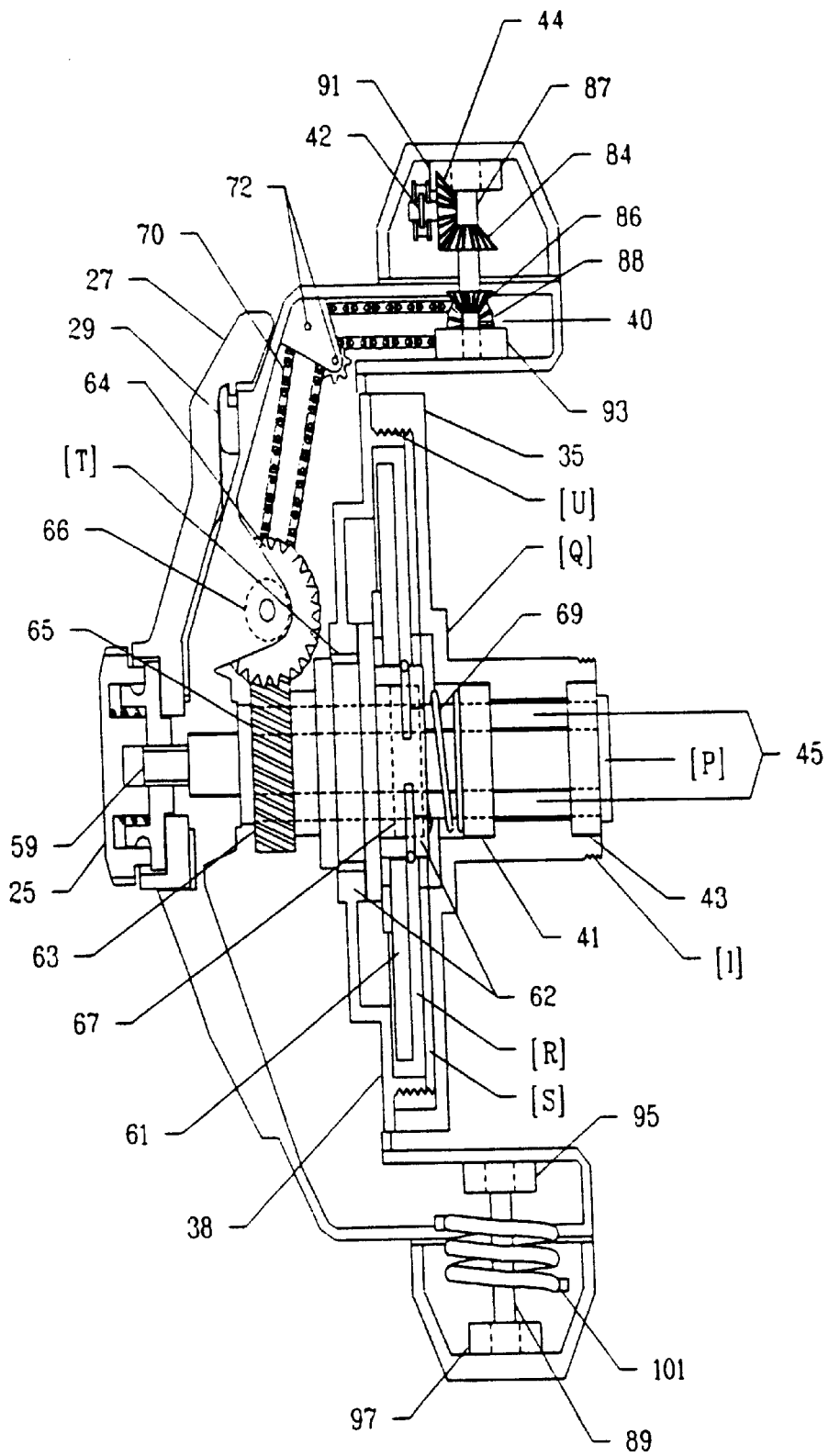
FIG. 7 is an enlarged cross-sectional side view (along cut-line VII—VII) of the spool chassis including the lever drag and drag pre-set knob as viewed from back to front of the first example of the present invention.

As shown in FIG. 7, the outer end of the drag rod 59 terminates into a flattened head at position P. This head secures the spool mount mechanism 35 within the spool chassis 13. The spool mount mechanism 35 is the carriage upon which the spool 37 attaches. A set of bearings 41 and 43 enable the spool mount mechanism 35 to revolve freely about the spool chassis's 13 main drive axle 45. Thrust bearing 43 also minimizes any frictional forces present between the revolving spool mount mechanism 35 and the non-revolving flattened head of the drag rod 59. A small, raised, square-shaped ridge (Position Q of FIG. 7) is positioned around the center of the external surface of the spool mount mechanism 35. This ridge is designed to interlock with the square-shaped indentation on the back-side of the spool 37.

The spool 37 is of single-body construction. The front face of the spool 37 is smooth to allow the fishing line to pay out with minimal resistance during a cast, while the back-side contains the indentation that slides over the ridge on the external side of the spool mount mechanism 35. When secured by the spool cap 47, which screws onto the threads on the end of the perimeter of the spool mount mechanism 35 (Position [I] of FIG. 7), the spool 37 locks to the spool mount mechanism 35, effectively making the combination a single unit.

While the exterior face of the spool mount mechanism 35 possesses the raised ridge, the internal face is smooth and can be covered by an industrial felt (Position S of FIG. 7) or other material having similar qualities. The internal face comprises one-half of the drag plane (Position R of FIG. 7) that is created via frictional interaction between the internal face of the spool mount mechanism 35 and a smooth surface drag washer 61. The drag washer 61 is designed to revolve about the spool chassis's main drive axle 45. This is accomplished by virtue of the main drive gear assembly 62 about which the drag washer 61 is rigidly affixed. Located on the inner-most front of this assembly is the teeth of the helical gear 63 of the main drive gear assembly 62 that is driven by the chain drive mechanism as described below. Located behind the helical gear 63 of the main drive gear assembly 62 (Position T of FIG. 7) is a recessed notch in which the internal one-half 38 of the spool mount mechanism 35 resides. This internal half 38 is essentially a large saucer-shaped washer that screws into the threads along the perimeter (Position U of FIG. 7) of the spool mount mechanism 35. When coupled together, the internal half 38 and the spool mount mechanism 35 effectively encase the drag washer 61 in a water-tight cavity. There is a track of continuous gear teeth along the perimeter of the outer face of the internal one-half 38 of the spool mount mechanism 35 (Position LL of FIG. 5). These gear teeth provide power to the level-wind mechanism 23 by virtue of a gear 50 (shown in FIG. 5) that is positioned between the gear teeth on the outer face of the internal one-half 38 of the spool mount mechanism 35 and the end of the level-wind assembly's threaded inner track 51.

The reel drive is the means by which torque is transferred from the crank handle to the spool. The main drive gear assembly 62 rests atop a set of bearings 65 and 67. The bearings 65 and 67 serve the dual purpose of enabling smooth axial revolution and eliminating horizontal movement of the main drive gear assembly 62, due to their relative position within the confines of the spool chassis 13. Positioned between the main drive gear assembly 62 and the spool mount mechanism 35 is a spring 69 that is coiled around the main drive axle 45. The spring 69 counters the frictional forces created between the two drag surfaces as the drag is decreased. This spring 69 provides the force necessary to put the reel 1 in a free-spool mode when the lever drag arm 27 is pulled into the vertical position. This is accomplished by eliminating contact between the surfaces of the drag washer 61 and the spool mount mechanism 35.

The helical gear 63 that is attached to the front of the main drive gear assembly 62 meshes with a second helical gear 64 who's axis is offset 90 degrees perpendicular (and non-intersecting) to that of the first helical gear 63. The second helical gear 64 rests atop bearing 66 that acts to minimize any force of friction as the gear 64 revolves about its axis. Though a combination of helical gears is described in this example as the preferred method of transferring torque to the main drive gear assembly 62, it should be noted that such a transfer of torque may alternately be accomplished through the use of other gear arrangements. One such arrangement includes a standard bevel set rather than the helical set as described. This is accomplished by simply offsetting the point at which the gears 63 and 64 mesh together to create a perpendicular shaft arrangement in an intersecting axis orientation as required by bevel gear or miter gear sets.

Figure 5:
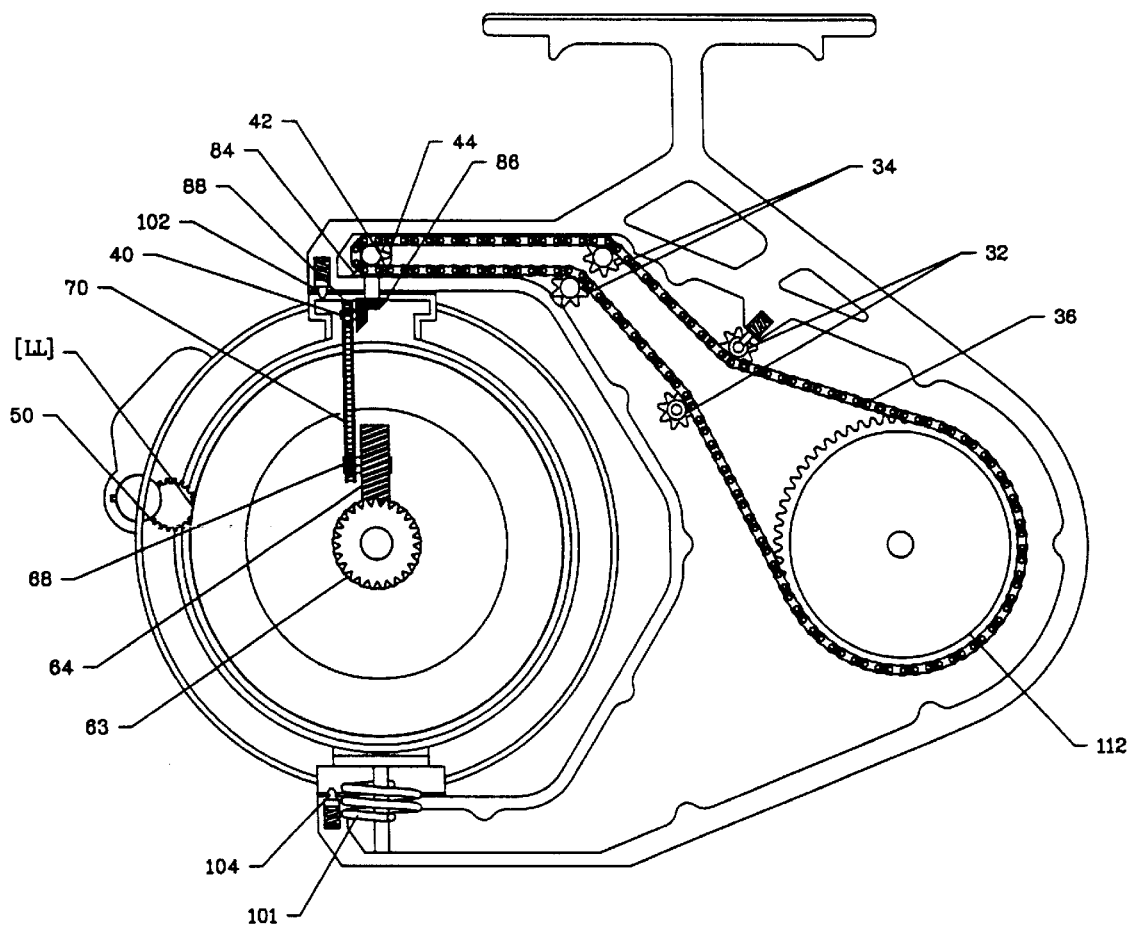
FIG. 5 is a left side cross-sectional view (along cut-line V—V) of the reel in line retrieval position showing the internal drive train of the first example of the present invention.
Figure 6:
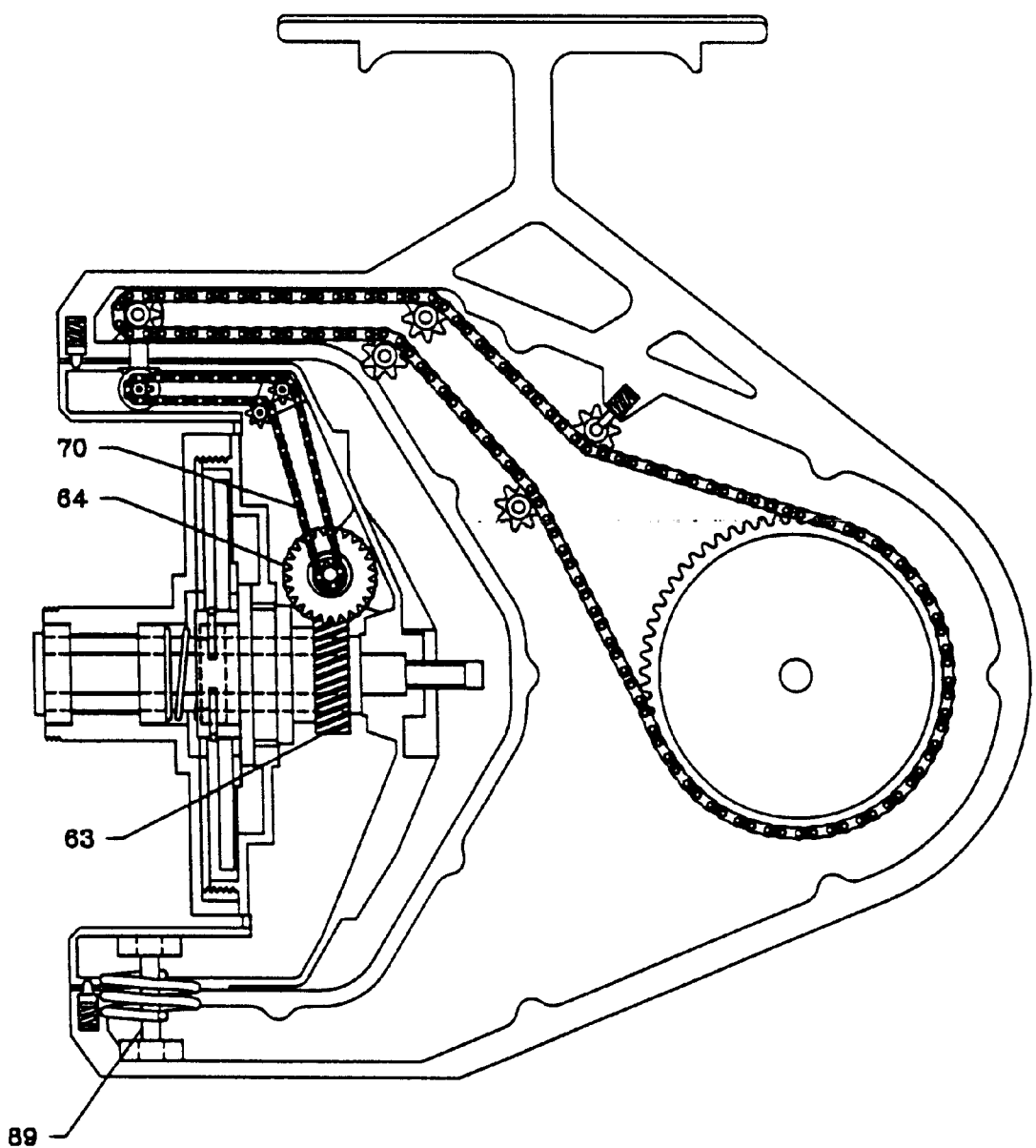
FIG. 6 is a left side cross-sectional view of the reel in casting position showing the internal drive train of the first example of the present invention.

As seen in FIG. 5, a chain sprocket 68 is rigidly attached to the back of, and rotates in unison with, the second helical gear 64. The links of the spool-chassis roller chain 70 are wound about the teeth of the chain sprocket 68. As best observed in FIG. 7, the spool-chassis roller chain 70 traverses up the internal side of the spool chassis 13 and rolls across a pair of miniature chain sprockets 72 that revolve about posts protruding from near the top of the spool chassis 13. The other end of the spool-chassis roller chain 70 winds about the lower pivot sprocket 40 that is rigidly attached to the back of, and rotates in unison with, the lower miter gear 88. As seen in FIG. 7, the lower miter gear 88 is similar in shape to a small bevel gear and forms a bevel-set style connection with the lower pivot-point gear 86. In turn, the upper pivot-point gear 84 is positioned just above the lower pivot-point gear 86 so that the gear's 84 and 86 major diameters face each other. In turn, the upper pivot-point gear 84 forms a bevel-set style connection with upper miter gear 44. And, like the unison of the lower miter gear 88 and the lower pivot sprocket 40, the upper pivot sprocket 42 is rigidly affixed to the back of, and revolves in unison with, the upper miter gear 44.

The upper and lower pivot-point gears 84 and 86 are rigidly attached about vertical pin 87 which forms the axis of rotation about which the spool chassis 13 revolves within the upper and lower drive support arms 15 and 17 of the main-body chassis 5. As seen in FIG. 7, vertical pin 87 is supported in position by a set of bearings 91 and 93. The bearings 91 and 93 ensure that vertical pin 87, and thus, the pivot-point gears 84 and 86 endure minimal resistance during revolution. The outer-most bearing 91 is anchored within indentations in the upper drive support arm 15, while the inner bearing 93 is anchored within indentations of the spool chassis 13.

Figure 8:
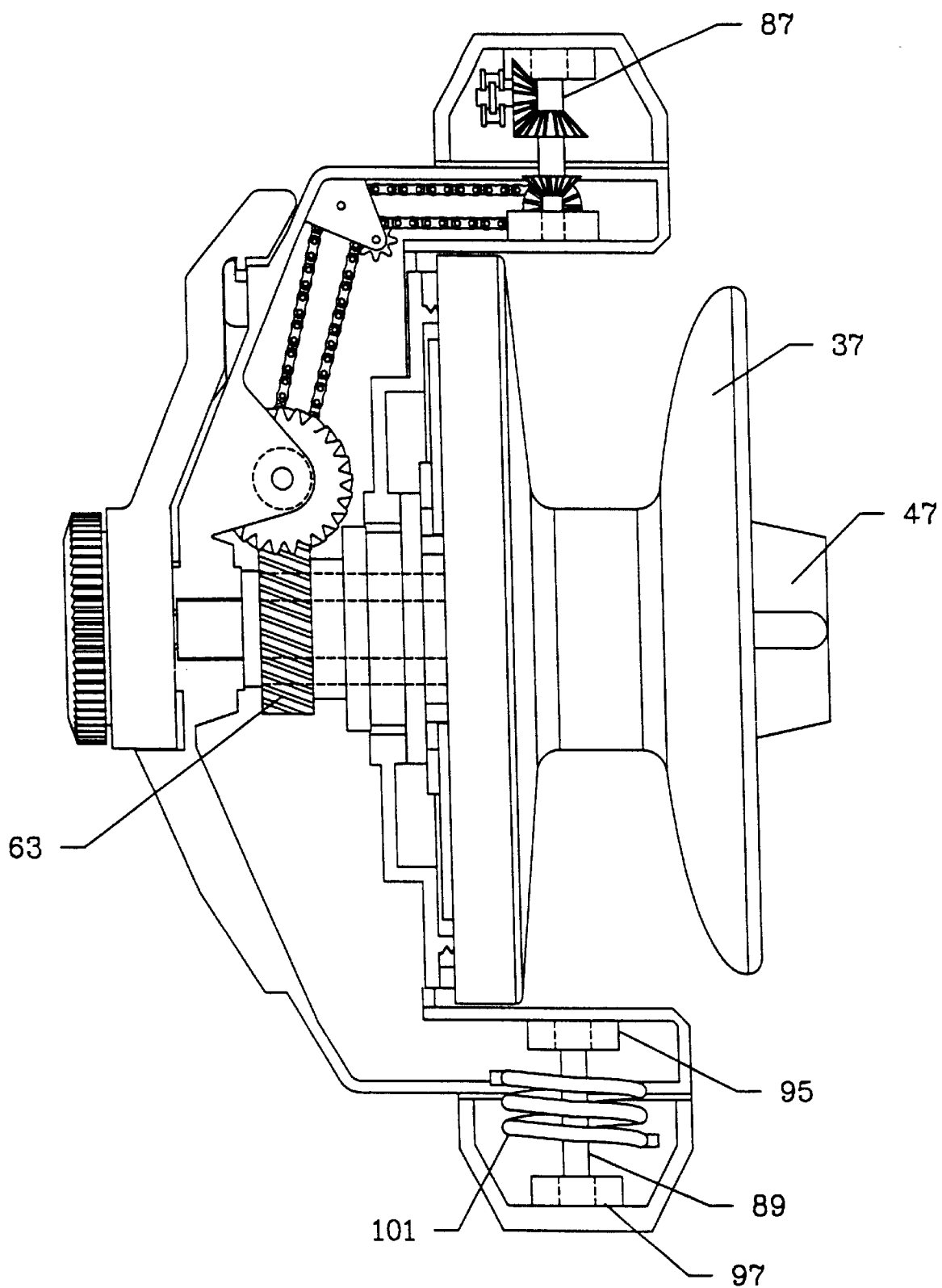
FIG. 8 is an enlarged cross-sectional side view (along cut-line VII—VII) of the spool chassis with the spool attached and including the lever drag and drag pre-set knob as viewed from back to front of the first example of the present invention.

As shown in FIGS. 3 and 8, the clothespin springs 99 and 101 are shaped like and operate similar to the springs found at the vertex of a common clothespin. The outer legs of the springs 99 and 101 are attached to the upper and lower drive support arms 15 and 17. The body of the springs 99 and 101 are coiled about the perimeter of the upper and lower pivot-point gears 84 and 86 in toward the spool chassis 13. The inner legs of the springs 99 and 101 extend into (and are attached to) the spool chassis 13. Because one end of the springs 99 and 101 is attached to the drive support arms 15 and 17, while the other end is attached to the spool chassis 13, they provide counter-resistance as the angler changes the position of the spool chassis 13 when switching from the normal fishing alignment to the casting alignment. Although coil springs are described in this application, counter-resistance can also be accomplished through the use of other mechanisms including other assemblies of springs whether coil, leaf, torsion, extension, compression, etc., as long as the configuration acts to oppose the rotation of the spool chassis 13 relative to the drive support arms 15 and 17.

The spool chassis 13 is fixed in the line retrieval position (relative to the plane of the upper and lower drive support arms 15 and 17) by a set of lock bearings 102 and 104 that are positioned within the upper and lower drive support arms 15 and 17, and interact with rotation tracks 98 and 100 that are cut into the outer sides of the spool chassis 13. As seen in FIG. 5, the lock bearings 102 and 104 resemble elongated spheres and are positioned within a cavity that is bored into the upper and lower drive support arms 15 and 17 of the main-body chassis 5. Small coil springs positioned beneath the bearings 102 and 104 in the cavity provide a vertical force upon the bearings 102 and 104, acting to push the bearings 102 and 104 out of their cavity and into the rotation tracks 98 and 100 of the spool chassis 13. Located at each end of the rotation track 98 and 100 (separated by 90 degrees) is a deeper depression relative to the depth of the rest of the track 98 and 100 as viewed in FIG. 4. The lock bearings 102 and 104 are housed within these deeper depressions when the reel 1 is either in the line retrieve position or the casting position.

As depicted in FIG. 5, the links of the main drive roller chain 36 are wrapped around the teeth of the upper pivot sprocket 42. This chain 36 traverses the upper drive support arm 15, crosses a pair of chain-guide sprockets 34 and enters the cavity of the main-body chassis 5 where it is guided by a pair of tensioning sprockets 32. Ultimately, the chain 36 wraps around the teeth located on the perimeter of the main sprocket 112. As the name implies, the tensioning sprockets 32 are spring activated (to oppose the natural tendency of the spring to sag under the force of gravity) so that they eliminate chain wobble and maintain constant tension on the main drive roller chain 36 as it is driven by the main sprocket 112 even though the crank handle 9 might be operated in a discontinuous or erratic fashion by the angler.

The main sprocket 112 is positioned at the geographic center of the main-body chassis 5. The main sprocket 112 is equipped with a crank handle extension (Position KK of FIG. 3) that protrudes from its axis of rotation and through the crank assembly 11 portion of the main-body chassis 5 at point F in FIG. 1. The reel 1 design can be modified to accommodate use by a left-handed angler by simply switching the side of the main sprocket 112 from which the crank handle extension protrudes.

A one-way bearing 117 is positioned about the circumference of the crank handle extension of the main sprocket 112 and housed between the crank handle extension and the crank assembly 11 portion of the main-body chassis 5. The one-way bearing 117 not only ensures that the main sprocket 112 endures minimal frictional resistance during revolution, but limits rotation of the main sprocket 112 to a single direction only as viewed from the perspective of FIG. 2.

In operation, because the main sprocket 112 is rigidly attached to the crank handle 9, it is revolved in a 1 to 1 ratio as the crank handle 9 is turned, while the reel 1 is in its "fishing alignment" as depicted in FIG. 1. Rotation of the main sprocket 112 produces equal propagation of the main drive roller chain 36. In this manner, torque (resulting from the angler's revolution of the crank handle 9) is ultimately transferred to the helical gear 63 of the main drive gear assembly 62 causing it to revolve about the main drive axle 45 (as viewed from the perspective of FIG. 5). Therefore, because the circumference of the helical gear 63 affixed to the front of the main drive gear assembly 62 is approximately one-fifth the circumference of the main sprocket 112, one revolution of the crank handle 9 results in approximately five systematic revolutions of the drag washer 61, which is rigidly affixed to the main drive gear assembly 62. Furthermore, this ratio is easily adjusted by varying the circumferences of any of these parts (112 and 63).

The spool 37, which is fastened to the spool mount mechanism 35 via the spool cap 47, is not connected to, nor driven by the drive train. Instead, it is free to revolve in either direction about the main drive axle 45. The spool mount mechanism 35 only experiences a torque from the drive train as the lever drag arm 27 is pushed forward. This action causes the drag rod 59 to be pulled to one side (as viewed in FIG. 7), thereby pulling the spool mount mechanism 35 to be within contact of the drag washer 61 (which is driven by the drive train). It is the force of friction created between the spool mount mechanism 35 and the drag washer 61 that causes the spool 37 to revolve in unison with the drive train. In this manner, the spool 37 will revolve (as viewed from the perspective of FIG. 1) when the crank handle 9 is turned. Because the spool mount mechanism 35 (and therefore the spool 37) is not directly engaged with the drive train, however, it can slip, counter to the direction of line retrieval, when the force being applied by a fish is greater than the frictional forces present between the spool mount mechanism 35 and the drag washer 61.

Although the design of this drag assembly pulls the spool mount mechanism 35 to within contact of the rigidly positioned drag washer 61, frictional forces between the two surfaces can be created by actually forcing (pushing) the drag washer 61 upon the spool mount mechanism 35 or via any other mechanism that creates frictional forces between the two surfaces. Furthermore, the invention does not necessarily need to incorporate a lever drag or drag pre-set knob (as described below). Any configuration (such as a "star-type" nut) that acts to pull (or push) the spool mount mechanism 35 together with the drag washer 61 thereby creating frictional forces between the members would suffice.

Although the drag mechanism described in this example is accomplished via frictional interaction between the spool mount mechanism 35 and the drag washer 61, it should be understood that similar drag forces may also be created via any a number of alternative mechanisms including hydraulics, fluid turbines, air compression, magnetic forces, etc. without straying from the spirit or purview of the present invention.

The force of friction or "drag" between the spool mount mechanism 35 and the drag washer 61 can be easily adjusted. The adjustment is accomplished by simply pushing the lever drag arm 27 forward to increase the drag, or pulling it back again to decrease the drag. The shape and configuration of the concentric center (axis of rotation) of the lever drag arm 27 provides the mechanism by which the drag rod 59 is pulled in and out of the spool chassis 13. The face of the concentric center of the lever drag arm 27 that is in contact with the spool chassis 13 is flat and smooth for ease of rotation against the body of the spool chassis 13, while the other face is designed with a quadrant arrangement of "peaks" and "valleys." As the lever drag arm 27 is moved in one direction, the "peaking" quadrants act against the drag pre-set knob 25 (which is screwed onto the end of the drag rod 59 effectively bounding the length of the drag rod 59), thereby forcing the drag rod 59 to be pulled to one side (as viewed in FIG. 7). Conversely, as the lever drag arm 27 is moved in the opposite direction, the "valley" quadrants relax the pressure against the drag pre-set knob 25 (due to spring member 69), enabling the drag rod 59 to slip back to the right (as viewed in FIG. 7), thereby decreasing the drag.

For example, when the lever drag arm 27 is in a vertical position (90 degrees from horizontal), the spool mount mechanism 35 ceases to be in contact with the drag washer 61 freeing the spool 37 to revolve in a direction counter to that of line retrieve. This is called the "free-spool" position and is an important feature because it enables the angler to allow a fish to run with the bait (without feeling tension on the line) prior to the hook set. In the present example of the invention, the relative ease with which the line is paid out while the reel 1 is in the "free-spool" position will be controlled by the depth of the notches carved into the "valley" quadrants of the concentric center of the lever drag arm 27. These notches will be just deep enough to allow the reel 1 to enter the free-spool mode, yet still maintain minimal contact with the drag washer 61. Minimal contact with the drag washer 61 ensures that the line will not become tangled due to an overrun which may otherwise occur when a fish pulls line out with a sudden burst of speed.

In an alternative example of the invention, the relative ease with which the line is paid out when the reel 1 is in the free-spool mode can be adjusted by the angler by the addition of a free-spool tension adjustment knob. Free-spool tension can be accomplished by exerting a small but adjustable resistance between the spool cap 47 (which revolves in concert with the spool 37) and the flattened end of the static (non-revolving) drag rod 59. In this case, the spool cap 47 will be modified to include a free-spool tension knob located at its center. The center of the spool cap 47 can be bored and threaded to accommodate this free-spool tension knob. The thimble-shaped knob's outer perimeter contains screw threads such that the free-spool tension knob is capable of screwing in and out of the threads of the spool cap 47. Additionally, the flattened end of the drag rod 59 will be extended beyond position P as viewed in FIG. 7 and taper into a point. A coiled spring is inserted into the confines of the free-spool tension knob and followed by a bearing. These are secured within the free-spool tension knob by a washer-shaped cap that allows the bearing to be pushed into the free-spool tension knob against the compressive forces of the spring. The spool cap 47, which contains the free-spool tension knob, is then securely fastened onto the end of the spool mount mechanism 35 in an identical nature as described in the invention. As the free-spool adjustment knob is screwed into the spool cap 47 toward the end of the tapered drag rod 59, the compressing spring will force the bearing to exert limited resistance upon the tapered end of the non-revolving drag rod 59. This minimal friction between the revolving spool cap 47 (which revolves in concert with the spool chassis 13 and spool 37) and the static drag rod 59, about which the spool chassis 13 revolves, exerts minor frictional forces which assist in eliminating overruns and tangles as line is stripped off the reel 1 (while in the free-spool mode) by a running fish. This frictional tension can be adjusted to suit the angler's preference by turning the free-spool tension knob in one direction to increase the tension and in the opposite direction to lessen it.

As the lever drag arm 27 is moved in one direction, the drag is increased until the arm 27 reaches a preset position, for example, the push button 31 at position QQ of FIG. 1. At position QQ, the force of drag present between the drag washer 61 and the spool mount mechanism 35 is "normally" set equivalent to the breaking strength of the fishing line in use. The word "normally" is used because the drag force presented when the lever drag arm 27 meets position QQ is pre-set by the angler. To increase or decrease drag forces, the drag preset knob 25, that screws onto the threads on the end of the drag rod 59, is adjusted to suit the angler's preference.

For example, turning the drag preset knob 25 clockwise (as viewed from the perspective of FIG. 1) will cause the threaded end of the drag rod 59 to be screwed into the drag preset knob 25 causing the length of the drag rod 59 to shorten—effectively pulling the flattened head of the drag rod 59 to the left in the perspective of FIG. 7. This results in greater friction (or drag) between the drag washer 61 and the spool mount mechanism 35. Conversely, turning the drag-preset knob 25 counter-clockwise will lengthen the drag rod 59 and lessen the drag between the drag washer 61 and the spool mount mechanism 35. In this manner, adjusting the drag preset knob 25 controls the range of the drag forces bestowed by the lever drag arm 27. By depressing the push button 31, the lever drag arm 27 can be pushed beyond position QQ until it finally reaches a position where the drag washer 61 and the spool mount mechanism 35 will effectively lock together. This is useful to apply maximum pressure to a tired fish or to intentionally break the line.

Figure 2:
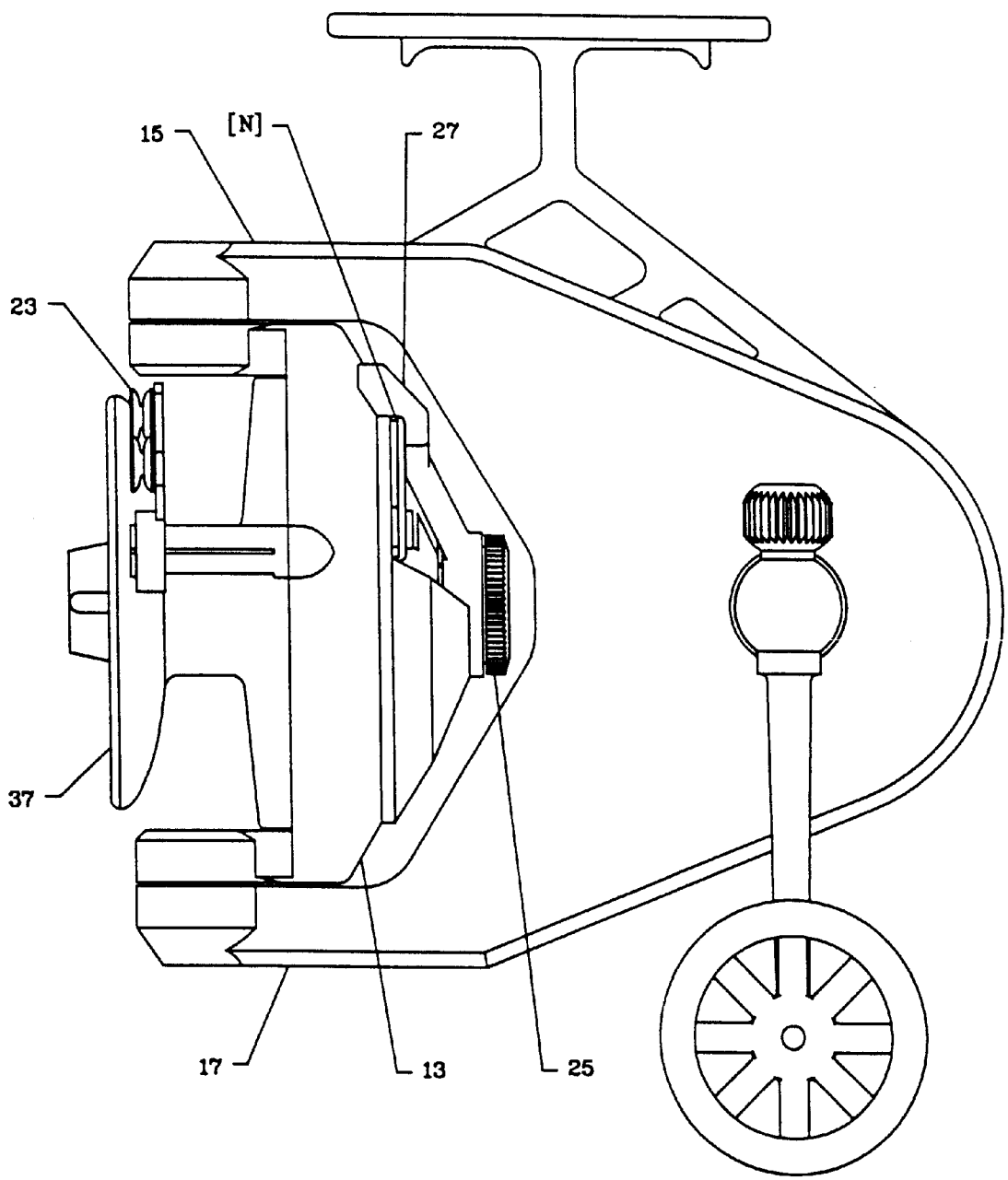
FIG. 2 is a left side view of the reel in casting position of the first example of the present invention.
Figure 4:
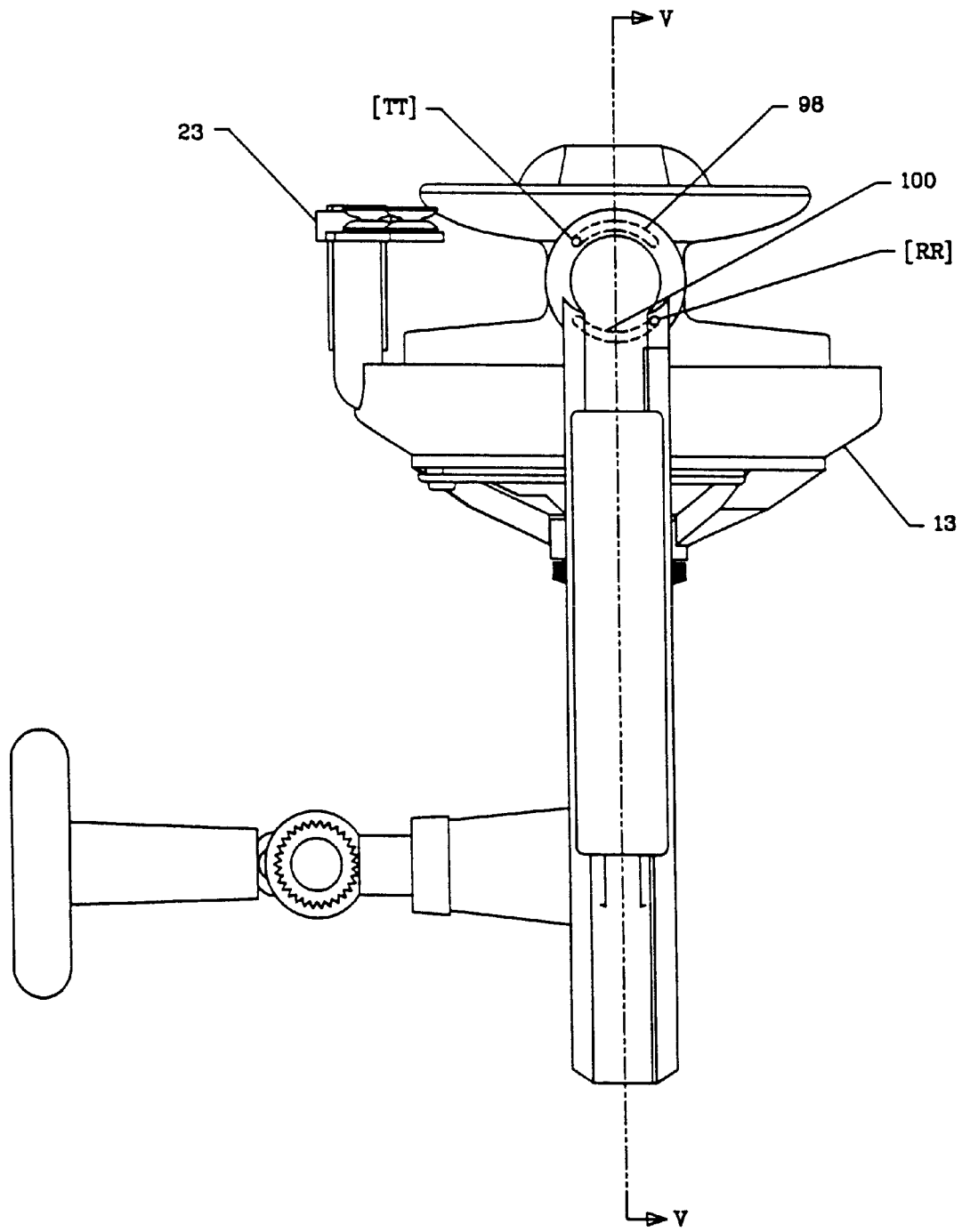
FIG. 4 is a top view of the reel in casting position of the first example of the present invention.

As depicted in the transition between FIGS. 1 and 2; or 3 and 4, to cast the bait, the line is gathered, from the level-wind mechanism 23, if provided, by the angler's finger, then the spool chassis 13 is rotated 90 degrees relative to the upper and lower drive support arms 15 and 17. As rotational torque is applied to the spool chassis 13, the lock bearings 102 and 104 traverse the rotation tracks 98 and 100 until they reach the depressions located at the ends of the track 98 and 100 (Positions RR and TT of FIG. 4). When the bearings 102 and 104 reach this position, the force of the springs behind the bearings 102 and 104 will cause them to "snap" into the depressions, effectively locking the spool chassis 13 in the line casting position, as shown in FIG. 4. The lock bearings 102 and 104 maintain the alignment of the spool 37 in either the casting position or line retrieval position. Such alignment can also be maintained by utilizing any configuration of latches, clamps, etc., as long as the spool chassis 13 is held in the casting position during a cast, and in the normal fishing alignment when retrieving the line.

When the line is released as the rod is thrust forward during a normal cast, the line is slipped off the front of the open end of the spool 37 towards the direction of the rod tip as is common with all spinning reel designs.

After the cast is completed, the line is gathered with the angler's finger and the crank handle 9 is turned. Torque exerted on the spool chassis 13 (relative to the main-body chassis 5) by the drive train, when coupled with assistance from the clothespin springs 99 and 101, overcomes the locking resistance of the lock bearings 102 and 104, causing the locking bearings 102 and 104 to again "snap" out of the depressions (Positions RR and TT of FIG. 4) and back into the rotation track 98 and 100. The spool chassis 13, therefore, will automatically revert back to the normal fishing alignment (of FIGS. 1 and 3) by rotating 90 degrees as viewed in the perspective of FIG. 3. As the spool chassis 13 completes this rotation, the level-wind mechanism 23, if provided, will catch the line that is being held by the angler's finger. Once the level-wind mechanism 23 catches the line, the angler releases the line and normal fishing operation is resumed.

The level-wind mechanism 23 is powered by revolution of the spool mount mechanism 35 not directly by the drive train mechanism. This design ensures that line is paid onto or off of the reel 1 in an even manner any time the spool 37 is revolving, whether being driven by the drive train or revolving due to the pulling of a fish. Gear teeth carved on the outer perimeter of the internal one-half 38 of the spool mount mechanism 35 (See position LL of FIG. 5) are engaged with a gear 50 that is mounted within the spool chassis 13. The gear 50, in turn, is engaged with the teeth on the end of the level wind assembly's 23 inner track 51. The gear 50 turns in unison with the revolution of the spool 37 which, in turn, causes the inner track 51 to revolve within the assembly's outer housing 49. The assembly's outer housing 49 contains a cutout section along the length of its bottom that exposes the inner track 51. The outer surface of the inner track 51 is grooved with a continuous and symmetric helical or criss-crossed pattern that is readily viewed by observing the cutout section of FIG. 3. This pattern forms a track in which the tabs (located along the inner perimeter) of the level-wind mechanism's 23 drive sled 53 reside. The sled 53 is sleeved about the assembly's outer housing 49 and its tab protrudes through the cut-out along the bottom of the outer housing 49 and into the criss-crossed grooves of the inner track 51. In this manner, the drive sled 53 is guided smoothly across the length of the assembly's outer housing 49 as the inner track 51 revolves within the outer housing 49. For example, the sled 53 slides to the right then back to the left repeatedly, evenly spanning the entire width of the spool 37. Two small bearing line guides 55 and 57 are attached to one side of the drive sled 49 as viewed in FIG. 3. Line guide 55 is attached nearer to the spool 37 and positioned lower (toward the bottom of the spool chassis 13) than the other line guide 57. The relative positioning of the line guides 55 and 57 create a guide for the line that enables the level-wind mechanism 23 to effectively manage and evenly distribute the line as the reel 1 is being utilized in its normal fishing alignment, yet enabling the line to be easily gathered from the level-wind assembly 23 by the angler when a cast is to be made. It should be understood, that while a level-wind mechanism is described in this invention, the function, intent and purpose of the invention remains intact with or without the inclusion of such a level-wind mechanism.

It should be noted that the effects created by the combination of miter gears and bevel gears as described in this example could easily be accomplished via other means such as the use of a single worm revolving about the axis of vertical pin 87 (to replace the upper and lower pivot-point gears 84 and 86) and worm gears (with identical sprockets 40 and 42 attached to their back) in place of the upper and lower miter gears 44 and 88. In fact, any mechanism that enables torque created by turning the crank handle 9 to propagate through to the main drive gear assembly 62 should be included within the purview of the appended claims.

It is important to note that while this description of the present invention includes a single drive train traversing through the upper drive support arm 15 and powering the helical gear 63 of the main drive gear assembly 62, it is to be understood that a second parallel set (also traversing through the upper drive support arm 15) of chains and sprockets may be incorporated without losing any of the functionality described herein or deviating from the present scope of the invention. Likewise, a second drive train (or set of drive trains) may be incorporated in addition to the upper drive train that would traverse the lower drive support arm 17 and lend power to the same helical gear 63. An example of how such a train may be easily incorporated is described in the second example of the present invention that follows. Furthermore, another embodiment of, the present invention is easily modified to support the application of a dual- or multi-speed drive train that will enable anglers to select between alternate speeds of fishing line retrieval within the same reel. This is easily accomplished by modifying the main sprocket 112 to rigidly attach a second (or more) sprocket of a differing circumference that is capable of the same 1:1 rotation with the crank handle 9, and, about the same axis of rotation. Next, an angler-activated shift lever is to be added. This lever is capable of shifting the main drive roller chain 36 from the original larger-diameter main sprocket 112 to the newly attached smaller one. The shifting mechanism operates in exactly the same manner as those used in common multi-speed bicycle gear shifters. It is anticipated that this modification will become a future enhancement of the invention and should be included within the spirit and purview of this application and the scope of the appended claims.

EXAMPLE 2

Figure 9:
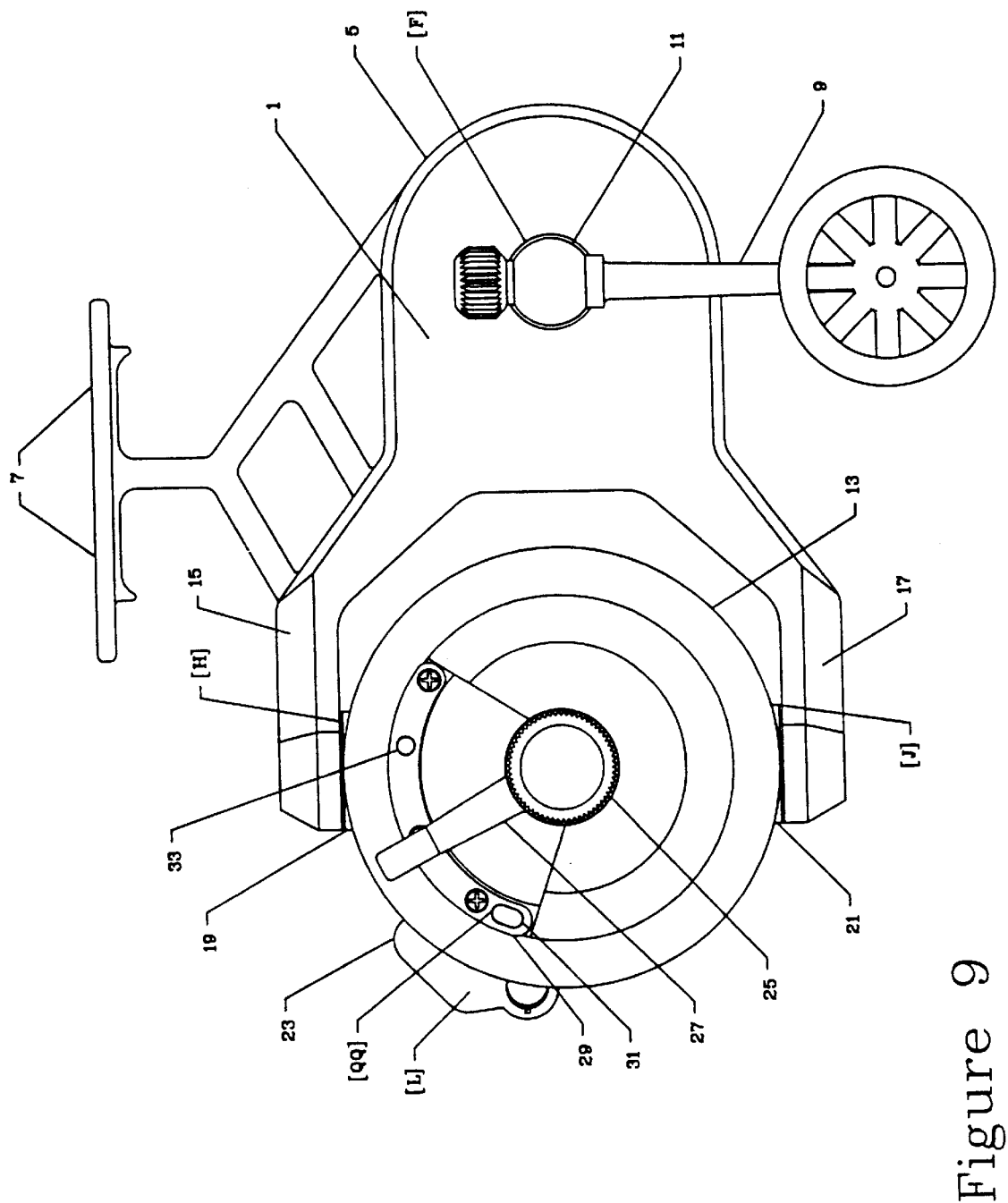
FIG. 9 is a left side view of the reel in line retrieval position of the second example of the present invention.

Referring now to FIG. 9, this figure depicts the entire reel assembly 1 in its line retrieve position of the second example of the invention. The main-body chassis 5 is constructed of two pieces (the housing and face plate) and designed to be water resistant. The main-body chassis mount 7 is the foundation upon which the reel 1 is attached to the fishing rod. The crank handle 9 is connected to the crank assembly 11 portion of the main-body chassis 5 at point F such that it is easily accessible by the angler and free for rotation. While in the configuration depicted in FIGS. 9 and 11, the spool chassis 13, and therefore, the spool 37, is aligned parallel to the direction of line retrieve, in its normal "fishing alignment." As shown in FIG. 9, the spool chassis 13 is connected to the upper and lower drive support arms 15 and 17 of the main-body chassis 5 at connection points H and J. As viewed in FIG. 15, the bodies are connected by vertical pins 87 and 89 that are common to, and transverse both components. The vertical pins 87 and 89 form the axis of rotation about which the spool chassis 13 revolves over a 90-degree arc within the upper and lower drive support arms 15 and 17 of the main-body chassis 5 when the angler wishes switch from the line retrieve position (of FIG. 9) to the line casting position (of FIG. 10) in order to cast the line. Rubber washers 19 and 21 are positioned at points H and J between the spool chassis 13 and main-body chassis 5 to dampen any frictional forces that may occur as the angler changes the position of the spool chassis 13 when switching from the normal fishing alignment to the casting alignment. The rubber washers 19 and 21 also act as a barrier against the penetration of moisture.

Figure 11:
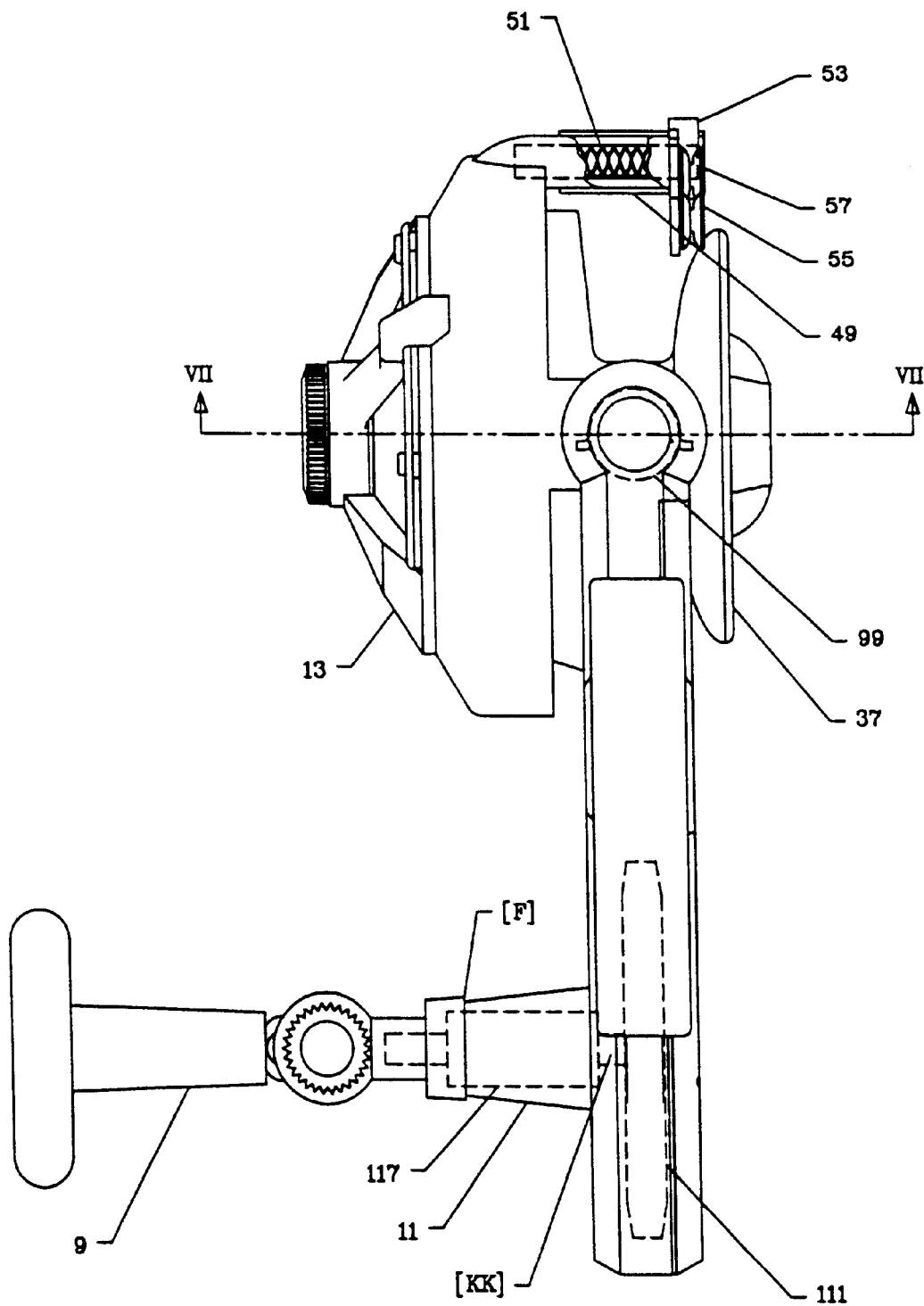
FIG. 11 is a top view of the reel in line retrieval position of the second example of the present invention.

The invention can include a level-winding mechanism. In one example, the level-wind mechanism 23 is an extension of the spool chassis 13, located at position L near the top of the spool chassis 13. As shown in FIG. 11, the level-wind mechanism 23 comprises five inter-working parts including the outer housing 49, the criss-crossed (helical) threaded inner track 51, the drive sled 53, and two small ball bearing line guides 55 and 57 that are attached to the drive sled 53.

As shown in FIG. 9, the drag pre-set knob 25 is positioned at the geographic center of the spool chassis 13 and mounted onto the end of the drag rod 59. As best viewed in FIG. 15, the drag rod 59 is a threaded member that traverses the drag pre-set knob 25, the lever drag arm 27, the spool chassis 13, the spool chassis' 13 main drive axle 45, and the spool mount mechanism 35.

Drag rod 59 bisects the lever drag arm 27 such that the lever arm 27 is free to revolve about an axis of rotation that is positioned at the center of the spool chassis 13. The plane of the drag rod 59 is normal to that of the lever drag arm 27, ensuring that the lever drag arm 27 remains equidistant from the spool chassis 13 as it is pushed through its entire range of motion. An arch-shaped flange bracket 29 is mounted near the top of the spool chassis 13. The flange bracket 29 interleaves within a groove in the lever drag arm 27 (Position N in FIG. 10) and helps support the lever drag arm 27 at the top of the spool chassis 13. The top of the flange bracket 29 may possess raised ridges or teeth that will create a "ratcheting" effect as the lever drag arm 27 is adjusted throughout its entire range of motion. Two independent push-buttons 31 and 33 protrude out of the spool chassis 13 and through the flange bracket 29. Each push-button 31 and 33 houses an internal spring that provides counter resistance when the push-button 31 and 33 is depressed. The push buttons 31 and 33 are positioned in such a manner as to restrict the range of motion of the lever drag arm 27.

Figure 15:
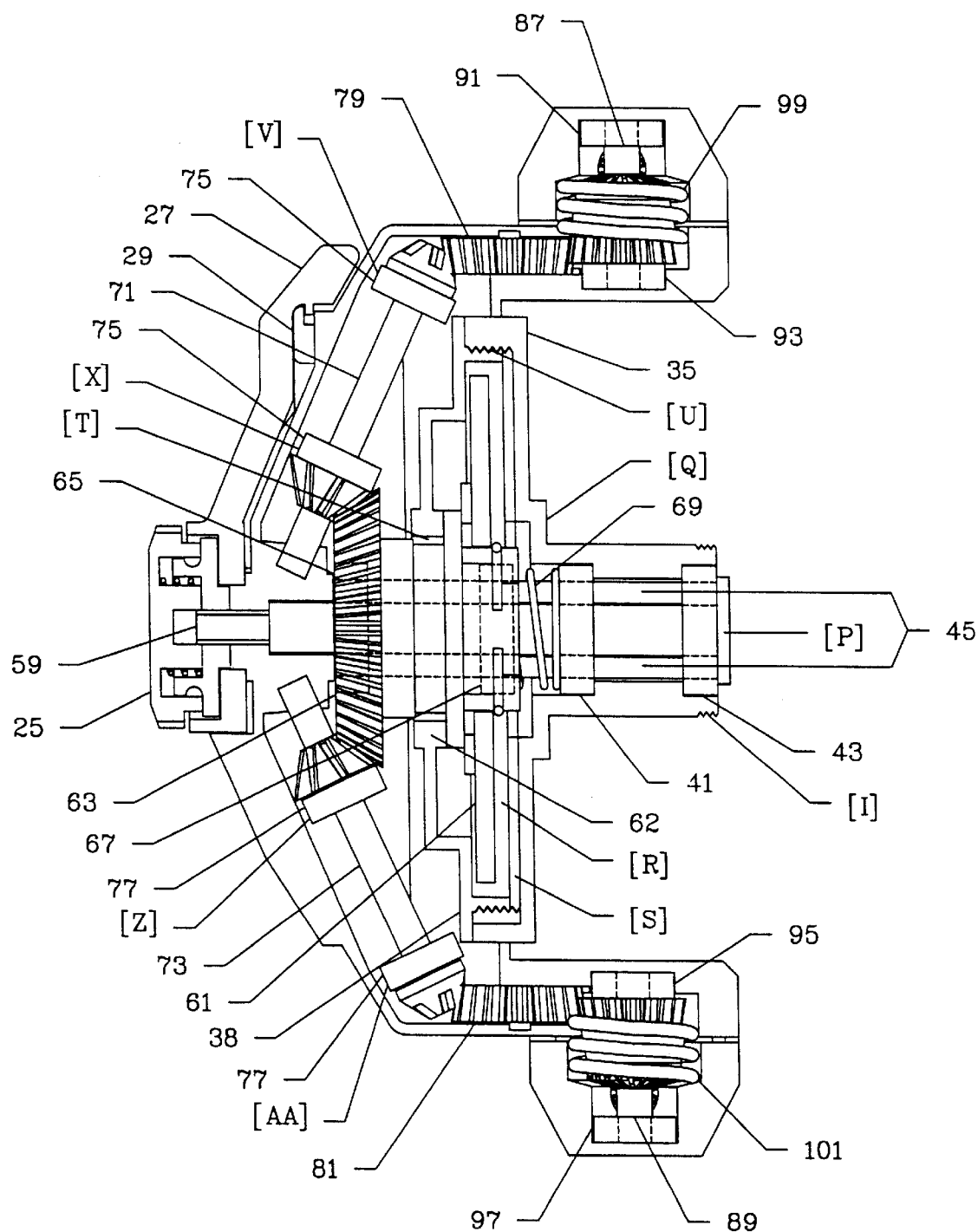
FIG. 15 is an enlarged cross-sectional side view (along cut-line VII—VII) of the spool chassis including the lever drag and drag pre-set knob as viewed from back to front of the second example of the present invention.

As shown in FIG. 15, the outer end of the drag rod 59 terminates into a flattened head at position P. This head secures the spool mount mechanism 35 within the spool chassis 13. The spool mount mechanism 35 is the carriage upon which the spool 37 attaches. A set of bearings 41 and 43 enable the spool mount mechanism 35 to revolve freely about the spool chassis's 13 main drive axle 45. Thrust bearing 43 also minimizes any frictional forces present between the revolving spool mount mechanism 35 and the non-revolving flattened head of the drag rod 59. A small, raised, square-shaped ridge (Position [Q] of FIG. 15) is positioned around the center of the external surface of the spool mount mechanism 35. This ridge is designed to interlock with the square-shaped indentation on the backside of the spool 37.

The spool 37 is of single-body construction. The front face of the spool 37 is smooth to allow the fishing line to pay out with minimal resistance during a cast, while the backside contains the indentation that slides over the ridge on the external side of the spool mount mechanism 35. When secured by the spool cap 47, which screws onto the threads on the end of the perimeter of the spool mount mechanism 35 (Position [I] of FIG. 15), the spool 37 locks to the spool mount mechanism 35, effectively making the combination a single unit.

While the exterior face of the spool mount mechanism 35 possesses the raised ridge, the internal face is smooth and can be covered by an industrial felt (Position S of FIG. 15) or other material with similar qualities. The internal face comprises one-half of the drag plane (Position R of FIG. 15) that is created via frictional interaction between the internal face of the spool mount mechanism 35 and a smooth surface drag washer 61. The drag washer 61 is designed to revolve about the spool chassis's main drive axle 45. This is accomplished by virtue of the main drive gear assembly 63 about which the drag washer 61 is rigidly affixed. Located on the inner-most front of this assembly is the gear teeth that comprise the main drive gear 63. Located behind the main drive gear 63 (Position T of FIG. 15) is a recessed notch in which the internal one-half 38 of the spool mount mechanism 35 resides. This internal half 38 is essentially a large saucer-shaped washer that screws into the threads along the perimeter (Position U of FIG. 15) of the spool mount mechanism 35. When coupled together, the internal half 38 and the spool mount mechanism 35 effectively encase the drag washer 61 in a water-tight cavity. There is a track of continuous gear teeth along the perimeter of the outer face of the internal one-half 38 of the spool mount mechanism 35 (Position LL of FIG. 13). These gear teeth provide power to the level-wind mechanism 23 by virtue of a gear 50 (shown in FIG. 13) that is positioned between the gear teeth on the outer face of the internal one-half 38 of the spool mount mechanism 35 and the end of the level-wind assembly's threaded inner track 51.

The main drive gear assembly 63 rests atop a set of bearings 65 and 67. The bearings 65 and 67 serve the dual purpose of enabling smooth axial revolution and eliminating horizontal movement of the main drive gear assembly 63, due to their relative position within the confines of the spool chassis 13. Positioned between the main drive gear assembly 63 and the spool mount mechanism 35 is a spring 69 that is coiled around the main drive axle 45. The spring 69 counters the frictional forces created between the two drag surfaces as the drag is decreased. This spring 69 provides the force necessary to put the reel 1 in a free-spool mode when the lever drag arm 27 is placed into the free-spool position. This is accomplished by eliminating contact between the surfaces of the drag washer 61 and the spool mount mechanism 35.

Engaged with the main drive gear assembly 63 are the upper and lower vertical gears 71 and 73. The upper and lower vertical gears 71 and 73 are supported in position within the spool chassis 13 by two sets of bearings 75 and 77. The bearings 75 and 77 are positioned at each end of the vertical gears 71 and 73 (Positions V, X, Z, and AA of FIG. 15) to ensure the vertical gears 71 and 73 experience minimal frictional resistance during revolution.

Figure 14:
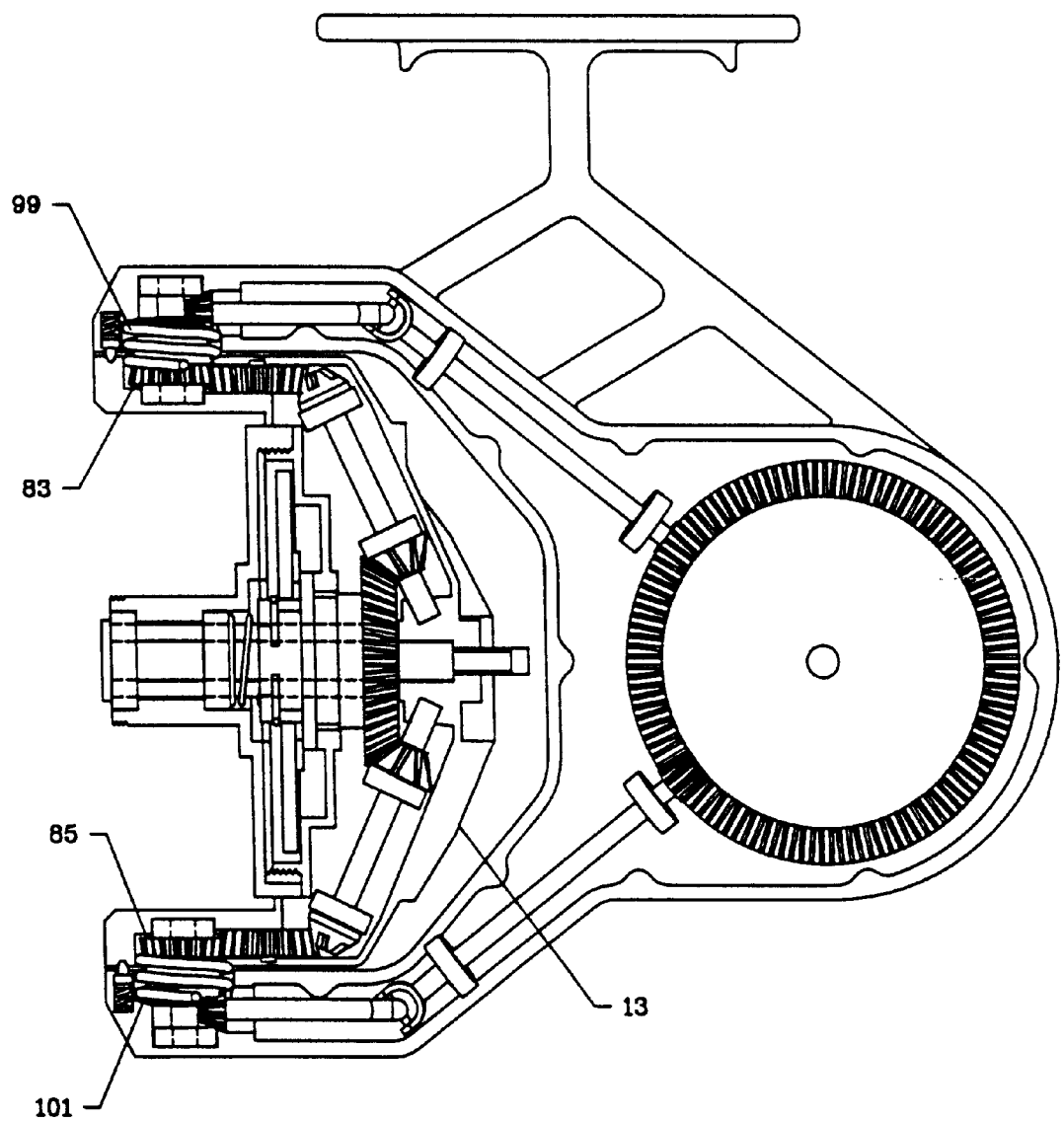
FIG. 14 is a left side cross-sectional view of the reel in casting position showing the internal drive train of the second example of the present invention.

The upper and lower vertical gears 71 and 73 engage with the upper and lower spreader gears 79 and 81, respectively, which are positioned at the very top and bottom of the spool chassis 13. The spreader gears 79 and 81, in turn, are engaged with the upper and lower pivot-point gears 83 and 85 along their major diameters. As shown in FIG. 14, each pivot-point gear 83 and 85 is common to both the spool chassis 13 and the upper or lower drive support arm 15 and 17 of the main-body chassis 5. The pivot-point gears 83 and 85 are shaped like a bell and are sleeved around and rotate about vertical pins 87 and 89 which form the axis of rotation about which the spool chassis 13 revolves within the upper and lower drive support arms 15 and 17 of the main-body chassis 5. As such, the pivot-point gears 83 and 85 enable the drive train to propagate from the main-body chassis 5 through to the spool chassis 13. The pivot-point gears 83 and 85 are designed to have two sets of gear teeth. One set is positioned along the perimeter of the major diameter of the pivot-point gear 83 and 85, while the second extends radially along the horizontal plane created as the pivot-point gear 83 and 85 narrows from its major diameter to its minor diameter.

Each pivot-point gear 83 and 85 is supported in position by a set of bearings 91, 93, 95, and 97. The bearings 91, 93, 95, and 97 ensure that the pivot-point gears 83 and 85 endure minimal resistance during revolution. The outer-most bearings 91 and 97 are anchored within indentations in the upper and lower drive support arms 15 and 17, while the inner bearings 93 and 95 are anchored within indentations in the spool chassis 13.

Figure 16:
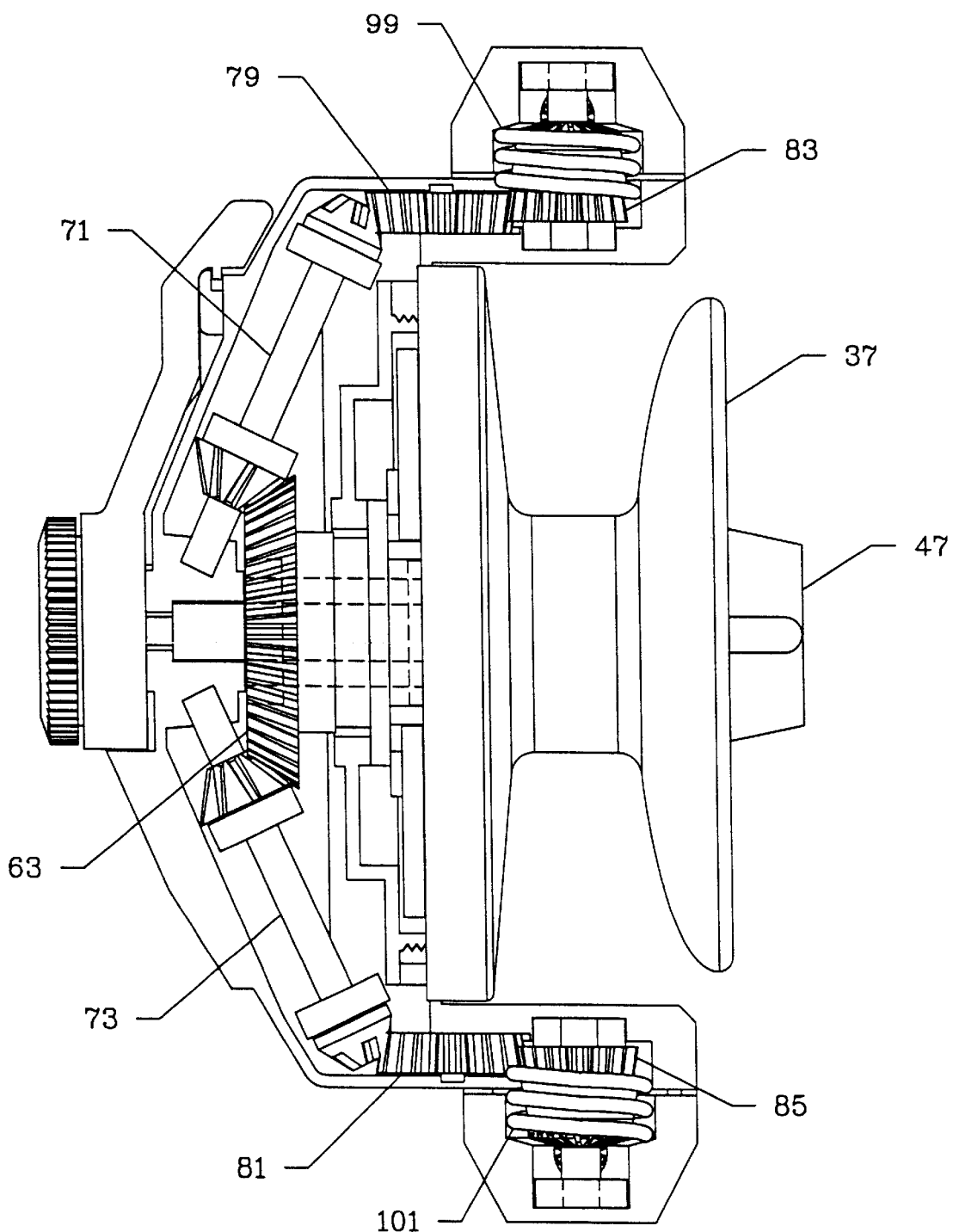
FIG. 16 is an enlarged cross-sectional side view (along cut-line VII—VII) of the spool chassis with the spool attached and including the lever drag and drag pre-set knob as viewed from back to front of the second example of the present invention.

As shown in FIGS. 11 and 16, the clothespin springs 99 and 101 are shaped like and operate similar to the springs found at the vertex of a common clothespin. The outer legs of the springs 99 and 101 are attached to the upper and lower drive support arms 15 and 17. The body of the springs 99 and 101 are coiled about the perimeter of the upper and lower pivot-point gears 83 and 85 in toward the spool chassis 13. The inner legs of the springs 99 and 101 extend into (and are attached to) the spool chassis 13. Because one end of the springs 99 and 101 are attached to the drive support arms 15 and 17, while the other end is attached to the spool chassis 13, they provide counter-resistance as the angler changes the position of the spool chassis 13 when switching from the normal fishing alignment to the casting alignment. Although coil springs are described in this application, counter-resistance can also be accomplished through the use of other mechanisms including other assemblies of springs whether coil, leaf, torsion, extension, compression, or other, as long as the configuration acts to oppose the rotation of the spool chassis 13 relative to the drive support arms 15 and 17.

Figure 12:
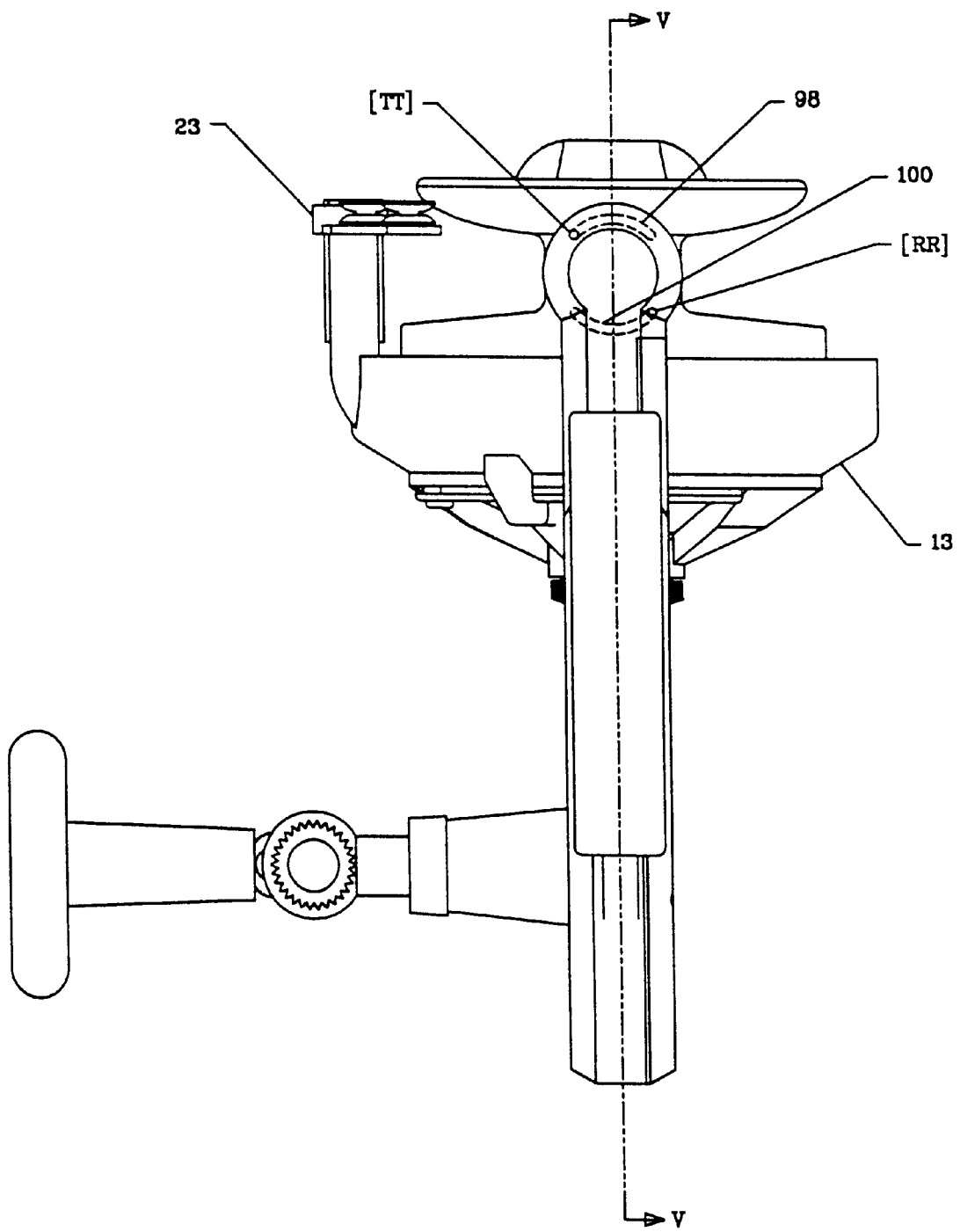
FIG. 12 is a top view of the reel in casting position of the second example of the present invention.
Figure 13:
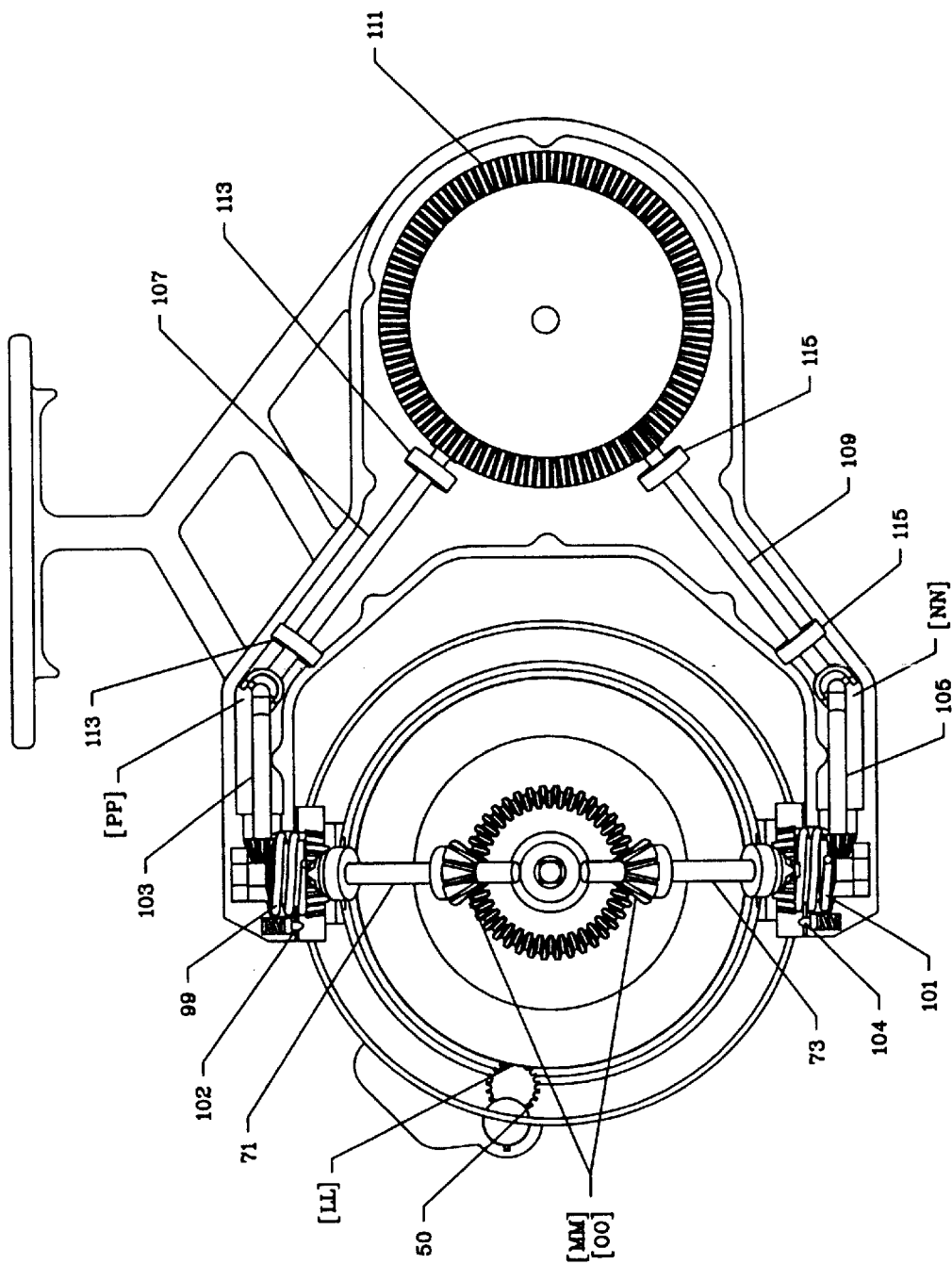
FIG. 13 is a left side cross-sectional view (along cut-line V—V) of the reel in line retrieve position showing the internal drive train of the second example of the present invention.

The spool chassis 13 is fixed in the line retrieve position (relative to the plane of the upper and lower drive support arms 15 and 17) by a set of lock bearings 102 and 104 that are positioned within the upper and lower drive support arms 15 and 17, and interact with rotation tracks 98 and 100 that are cut into the outer sides of the spool chassis 13. As seen in FIG. 13, the lock bearings 102 and 104 resemble elongated spheres and are positioned within a cavity that is bored into the upper and lower drive support arms 15 and 17 of the main-body chassis 5. Small coil springs positioned beneath the bearings 102 and 104 in the cavity provide a vertical force upon the bearings 102 and 104, acting to push the bearings 102 and 104 out of their cavity and into the rotation tracks 98 and 100 of the spool chassis 13. Located at each end of the rotation track 98 and 100 (separated by 90 degrees) is a deeper depression relative to the depth of the rest of the track 98 and 100 as viewed in FIG. 12. The lock bearings 102 and 104 are housed within these deeper depressions when the reel 1 is either in the line retrieve or casting position.

The extension bevel gears 90 and 92 situated on the extremities of the upper and lower extension shafts 103 and 105 are engaged with the horizontal gear face of the pivot-point gears 83 and 85 such that they form a bevel-set style connection. The opposite end of the extension shaft 103 and 105 terminates into one half of a standard U-joint connection (at points NN and PP) that is formed with the upper and lower pinion shafts 107 and 109. For reference, however, the connection between the extension shafts 103 and 105 and the pinion shafts 107 and 109 can be accomplished through any other means (such as flexible couplings, bellows couplings, helical couplings, split type couplings, disk couplings, spring couplings, ball couplings, flexible shafts, gear-to-gear connections, etc.) not just the U-joint connection described in this example, as long as the drive torque is adequately propagated through this connection.

As seen in FIG. 13, the upper and lower pinion shafts 107 and 109 stretch from the termini of the extension shafts 103 and 105 (where they form the second one-half of the U-joint connection) until they form a second set of pinion-style gears 94 and 96 at their ends. The pinion gears 94 and 96 (located at the ends of the extension shafts 103 and 105) engage the main gear 111 in a bevel-set style connection. The upper pinion shaft's 107 pinion gear 94 is engaged with the gear teeth on the right-hand face of the main gear 111 (as viewed from an aerial perspective), while the lower pinion shaft's 109 pinion gear 96 is engaged with the opposite gear teeth on the left-hand face of the main gear 111.

The upper and lower pinion shafts 107 and 109 are supported in position by a set of bearings 113 and 115. The bearings 113 and 115 are strategically positioned at each end of the pinion shafts 107 and 109 to ensure each shaft endures minimal frictional resistance during revolution.

The main gear 111 is positioned at the geographic center of the main-body chassis 5. The main gear 111 is equipped with a crank handle extension (Position KK of FIG. 11) that protrudes from its axis of rotation and through the crank assembly 11 portion of the main-body chassis 5 at point F in FIG. 9. The reel 1 design can be modified to accommodate use by a left-handed angler by simply switching the side of the main gear 111 from which the crank handle extension protrudes.

A one-way bearing 117 is positioned about the circumference of the crank handle extension of the main gear 111 and housed between the crank handle extension and the crank assembly 11 portion of the main-body chassis 5. The one-way bearing 117 not only ensures that the main gear 111 endures minimal frictional resistance during revolution, but limits revolution of the main gear 111 to a single direction only as viewed from the perspective of FIG. 2.

In operation, because the main gear 111 is rigidly attached to the crank handle 9, it is revolved in a 1 to 1 ratio as the crank handle 9 is turned, while the reel 1 is in its "fishing alignment" as depicted in FIG. 9. Revolution of the main gear 111 (as viewed from the perspective of FIG. 13) produces an equal but opposite revolution of the upper and lower pinion shafts 107 and 109. As can be seen in FIG. 13, opposite directions of rotation for the upper and lower drive trains is paramount because each train ultimately meets and contributes to the revolution of common gear teeth on the main drive gear assembly 63 at positions MM and OO respectively. Opposing revolution of the pinion shafts 107 and 109 is possible because the pinion gears 94 and 96 (which are located on the end of the extension shafts 103 and 105) are engaged to the opposing faces of the main gear 111. In this manner, torque (resulting from the angler's revolution of the crank handle 9) is ultimately propagated to the main drive gear assembly 63 causing it to revolve about the main drive axle 45. It is important to note that while this invention includes the description of both an upper and lower drive train, identical torque upon the main drive gear assembly 63 (about which the drag washer 61 is rigidly affixed) can be created via a single drive train as was the case described in the first example of the invention. This example includes both an upper and lower drive train for strength, support, and redundancy. Furthermore, this example of the described invention may alternately be driven via any combination of gears (spur, helical, bevel, worm, miter, etc.) chains, belts, ropes, slew drives, winches or winch drives, crawler drives, wheel drives, aerator drives, pump drives, hydraulic drives, electric drives, etc., and the design and/or sequence may vary without straying from the purview of the present invention.

Revolution of the pinion shafts 107 and 109 is evenly transferred to the upper (and lower) extension shafts 103 and 105 through the use of standard U-Joints as seen in FIG. 13. In this manner, torque (resulting from the angler's revolution of the crank handle 9) is ultimately propagated to the upper and lower pivot-point gears 83 and 85 through the extension bevel gears 90 and 92 that are located on the ends of the extension shafts 103 and 105.

As depicted in FIG. 15, revolution of the pivot-point gears 83 and 85 causes the upper and lower spreader gears 79 and 81 to revolve which, in turn, creates torque on the upper and lower vertical gears 71 and 73. Equal (but opposite) revolution of the vertical gears 71 and 73 ultimately forces the main drive gear assembly 63 to revolve about the main drive axle 45. Therefore, one revolution of the crank handle 9 results in approximately five systematic revolutions of the drag washer 61, which is rigidly affixed to the main drive gear assembly 63.

The spool 37, which is fastened to the spool mount mechanism 35 via the spool cap 47, is not connected to, nor driven by the drive train. Instead, it is free to revolve in either direction about the main drive axle 45. The spool mount mechanism 35 only experiences a torque from the drive train as the lever drag arm 27 is pushed forward. This action causes the drag rod 59 to be pulled to one side (as viewed in FIG. 15), thereby pulling the spool mount mechanism 35 to be within contact of the drag washer 61 (which is driven by the drive train). It is the force of friction created between the spool mount mechanism 35 and the drag washer 61 that causes the spool 37 to revolve in unison with the drive train. In this manner, the spool 37 will revolve when the crank handle 9 is turned. Because the spool mount mechanism 35 (and therefore the spool 37) is not directly engaged with the drive train, however, it can slip, counter to the direction of line retrieve, when the force being applied by a fish is greater than the frictional forces present between the spool mount mechanism 35 and the drag washer 61.

Although the design of this drag assembly pulls the spool mount mechanism 35 to within contact of the rigidly positioned drag washer 61, frictional forces between the two surfaces can be created by actually forcing (pushing) the drag washer 61 upon the spool mount mechanism 35 or via any other mechanism that creates frictional forces between the two surfaces. Furthermore, the invention does not necessarily need to incorporate a lever drag or drag pre-set knob (as described below). Any configuration (such as a "star-type" nut) that acts to pull (or push) the spool mount mechanism 35 together with the drag washer 61 thereby creating frictional forces between the members would suffice.

Although the drag mechanism described in this example is accomplished via frictional interaction between the spool mount mechanism 35 and the drag washer 61, it should be understood that similar drag forces may also be created via any a number of alternative mechanisms including hydraulics, fluid turbines, air compression, magnetic forces, etc. without straying from the spirit or purview of the present invention.

The force of friction or "drag" between the spool mount mechanism 35 and the drag washer 61 can be easily adjusted. The adjustment is accomplished by simply pushing the lever drag arm 27 forward to increase the drag, or pulling it back again to decrease the drag. The shape and configuration of the concentric center (axis of rotation) of the lever drag arm 27 provides the mechanism by which the drag rod 59 is pulled in and out of the spool chassis 13. The face of the concentric center of the lever drag arm 27 that is in contact with the spool chassis 13 is flat and smooth for ease of rotation against the body of the spool chassis 13, while the other face is designed with a quadrant arrangement of "peaks" and "valleys." As the lever drag arm 27 is moved in one direction, the "peaking" quadrants act against the drag pre-set knob 25 (which is screwed onto the end of the drag rod 59, effectively bounding the length of the drag rod 59), thereby forcing the drag rod 59 to be pulled to one side (as viewed in FIG. 15). Conversely, as the lever drag arm 27 is moved in the opposite direction, the "valley" quadrants relax the pressure against the drag pre-set knob 25 (due to spring member 69), enabling the drag rod 59 to slip back to the other side (as viewed in FIG. 15), thereby decreasing the drag.

For example, when the lever drag arm 27 is in a vertical position (90 degrees from horizontal), the spool mount mechanism 35 ceases to be in contact with the drag washer 61 freeing the spool 37 to revolve in a direction counter to that of line retrieve. This is called the "free-spool" position and is an important feature because it enables the angler to allow a fish to run with the bait (without feeling tension on the line) prior to the hook set. In the present embodiment of the invention, the relative ease with which the line is paid out while the reel 1 is in the "free-spool" position will be controlled by the depth of the notches carved into the "valley" quadrants of the concentric center of the lever drag arm 27. These notches will be just deep enough to allow the reel 1 to enter the free-spool mode, yet still maintain minimal contact with the drag washer 61. Minimal contact with the drag washer 61 ensures that the line will not become tangled due to an overrun which may otherwise occur when a fish pulls line out with a sudden burst of speed.

In an alternative example of the invention, the relative ease with which the line is paid out when the reel 1 is in the free-spool mode can be adjusted by the angler by the addition of a free-spool tension adjustment knob. Free-spool tension can be accomplished by exerting a small but adjustable resistance between the spool cap 47 (which revolves in concert with the drag washer 61) and the flattened end of the static (non-revolving) drag rod 59. In this case, the spool cap 47 will be modified to include a free-spool tension knob located at its center. The center of the spool cap 47 can be bored and threaded to accommodate this free-spool tension knob. The thimble-shaped knob's outer perimeter contains screw threads such that the free-spool tension knob is capable of screwing in and out of the threads of the spool cap 47. Additionally, the flattened end of the drag rod 59 will be extended beyond (to the right of) position P as viewed in FIG. 15 and taper into a point. A coiled spring is inserted into the confines of the free-spool tension knob and followed by a bearing. These are secured within the free-spool tension knob by a washer-shaped cap that allows the bearing to be pushed into the free-spool tension knob against the compressive forces of the spring. The spool cap 47, which contains the free-spool tension knob, is then securely fastened onto the end of the spool mount mechanism 35 in an identical nature as described in the invention. As the free-spool adjustment knob is screwed into the spool cap 47 toward the end of the tapered drag rod 59, the compressing spring will force the bearing to exert limited resistance upon the tapered end of the non-revolving drag rod 59. This minimal friction between the revolving spool cap 47 (which revolves in concert with the spool chassis 13 and spool 37) and the static drag rod 59, about which the spool chassis 13 revolves, exerts minor frictional forces which assist in eliminating overruns and tangles as line is stripped off the reel 1 (while in the free-spool mode) by a running fish. This frictional tension is easily adjusted to suit the angler's preference by turning the free-spool tension knob in one direction to increase the tension and in the opposite direction to lessen it.

As the lever drag arm 27 is moved in one direction, the drag is increased until the arm 27 reaches a preset position, for example, the push button 31 at position QQ of FIG. 9. At position QQ, the force of drag present between the drag washer 61 and the spool mount mechanism 35 is "normally" set equivalent to the breaking strength of the fishing line in use. The word "normally" is used because the drag force presented when the lever drag arm 27 meets position QQ is pre-set by the angler. To increase or decrease drag forces, the drag preset knob 25, that screws onto the threads on the end of the drag rod 59, is adjusted to suit the angler's preference. For example, turning the drag preset knob 25 one direction (as viewed from the perspective of FIG. 9) will cause the threaded end of the drag rod 59 to be screwed into the drag preset knob 25 causing the length of the drag rod 59 to shorten—effectively pulling the flattened head of the drag rod 59 (and therefore the spool mount mechanism 35) nearer to the drag washer 61. This results in greater friction (or drag) between the drag washer 61 and the spool mount mechanism 35. Conversely, turning the drag-preset knob 25 the other direction will lengthen the drag rod 59 and lessen the drag between the drag washer 61 and the spool mount mechanism 35. In this manner, adjusting the drag preset knob 25 controls the range of the drag forces bestowed by the lever drag arm 27. By depressing the push button 31, the lever drag arm 27 can be pushed beyond position QQ until it finally reaches a horizontal position, at which time the drag washer 61 and the spool mount mechanism 35 will effectively lock together. This is useful to apply maximum pressure to a tired fish or to intentionally break the line.

Figure 10:
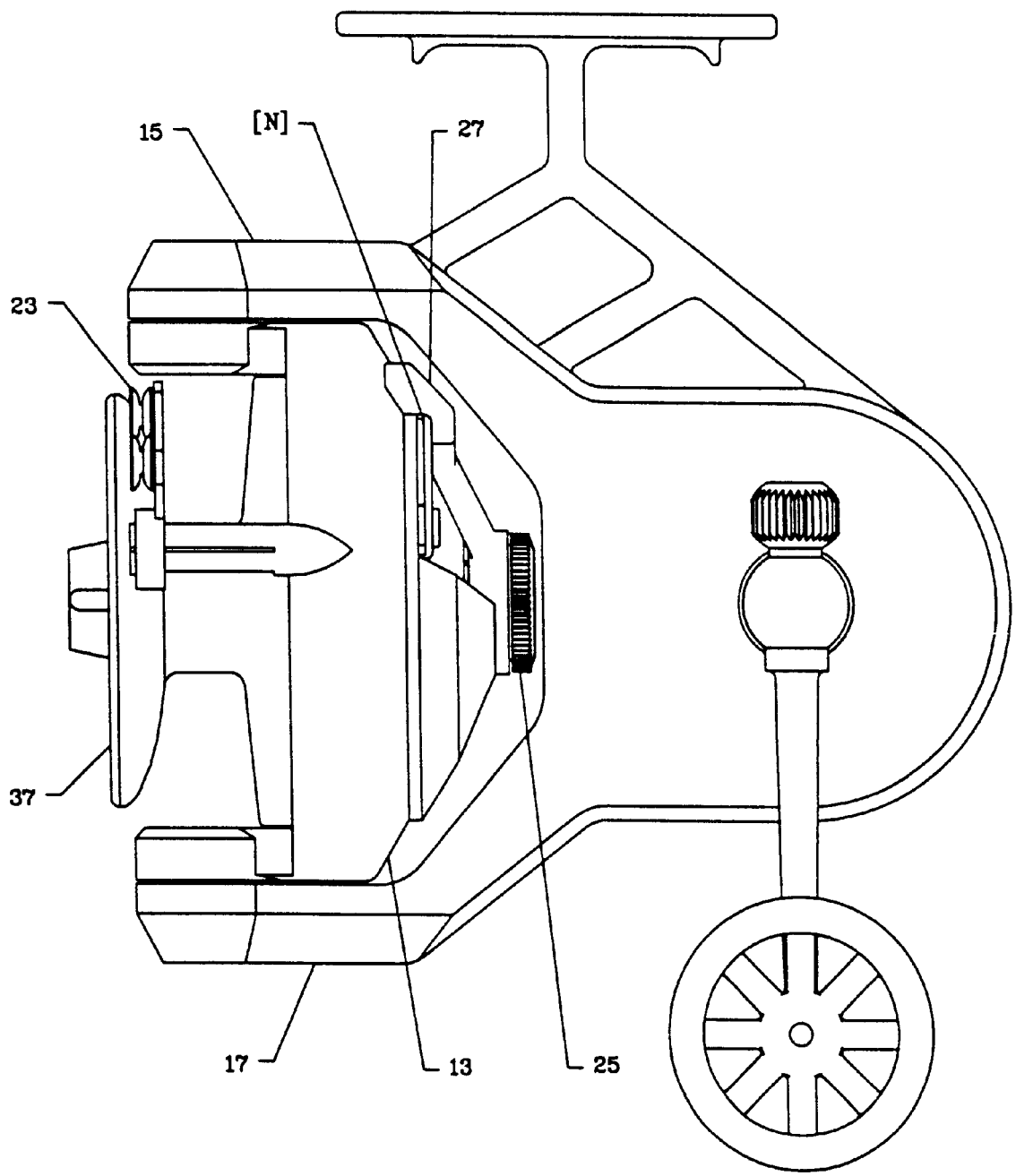
FIG. 10 is a left side view of the reel in casting position of the second example of the present invention.

As depicted in the transition between FIGS. 9 and 10; or 11 and 12, to cast the bait, the line is gathered, from the level-wind mechanism 23, if provided, by the angler's finger, then the spool chassis 13 is rotated 90 degrees relative to the upper and lower drive support arms 15 and 17. As rotational torque is applied to the spool chassis 13, the lock bearings 102 and 104 traverse the rotation tracks 98 and 100 until they reach the depressions located at the ends of the track 98 and 100 (Positions RR and TT of FIG. 12). When the bearings 102 and 104 reach this position, the force of the springs behind the bearings 102 and 104 will cause them to "snap" into the depressions, effectively locking the spool chassis 13 in the line casting position, as shown in FIG. 12. The lock bearings 102 and 104 maintain the alignment of the spool 37 in either the casting position or line retrieval position. Such alignment can also be maintained by utilizing any configuration of latches, clamps, etc., as long as the spool chassis 13 is held in the casting position during a cast, and in the normal fishing alignment when retrieving the line.

When the line is released as the rod is thrust forward during a normal cast, the line is slipped off the front of the open end of the spool 37 towards the direction of the rod tip as is common with all spinning reel designs.

After the cast is completed, the line is gathered with the angler's finger and the crank handle 9 is turned. The torque exerted on the spool chassis 13 (relative to the main-body chassis 5) by the drive train, when coupled with assistance from the clothespin springs 99 and 101, overcomes the locking resistance of the lock bearings 102 and 104, causing the locking bearings 102 and 104 to again "snap" out of the depressions (Positions RR and TT of FIG. 12) and back into the rotation track 98 and 100. The spool chassis 13, therefore, will automatically revert back to the normal fishing alignment (of FIGS. 9 and 11) by rotating 90 degrees as viewed in the perspective of FIG. 11. As the spool chassis 13 completes this rotation, the level-wind mechanism 23, if provided, will catch the line that is being held by the angler's finger. Once the level-wind mechanism 23 catches the line, the angler releases the line and normal fishing operation is resumed.

The level-wind mechanism 23 is powered by revolution of the spool mount mechanism 35, not directly by the drive train mechanism. This design ensures that line is paid onto or off of the reel 1 in an even manner any time the spool 37 is revolving, whether being driven by the drive train or revolving due to the pulling of a fish. Gear teeth carved on the outer perimeter of the internal one-half 38 of the spool mount mechanism 35 (See position LL of FIG. 13) are engaged with a gear 50 that is mounted within the spool chassis 13. The gear 50, in turn, is engaged with the teeth on the end of the level wind assembly's 23 inner track 51. The gear 50 turns in unison with the revolution of the spool 37 which, in turn, causes the inner track 51 to revolve within the assembly's outer housing 49. The assembly's outer housing 49 contains a cutout section along the length of its bottom that exposes the inner track 51. The outer surface of the inner track 51 is grooved with a continuous and symmetric helical or criss-crossed pattern that is readily viewed by observing the cutout section of FIG. 11. This pattern forms a track in which the tabs (located along the inner perimeter) of the level-wind mechanism's 23 drive sled 53 reside. The sled 53 is sleeved about the assembly's outer housing 49 and its tab protrudes through the cut-out along the bottom of the outer housing 49 and into the criss-crossed grooves of the inner track 51. In this manner, the drive sled 53 is guided smoothly across the length of the assembly's outer housing 49 as the inner track 51 revolves within the outer housing 49. For example, the sled 53 slides to the right then back to the left repeatedly, evenly spanning the entire width of the spool 37. Two small bearing line guides 55 and 57 are attached to one side of the drive sled 49 as viewed in FIG. 11. Line guide 55 is attached nearer to the spool 37 and positioned lower (toward the bottom of the spool chassis 13) than the other line guide 57. The relative positioning of the line guides 55 and 57 create a guide for the line that enables the level-wind mechanism 23 to effectively manage and evenly distribute the line as the reel 1 is being utilized in its normal fishing alignment, yet enabling the line to be easily gathered from the level-wind assembly 23 by the angler when a cast is to be made. It should be understood, that while a level-wind mechanism is described in this invention, the function, intent and purpose of the invention remains intact with or without the inclusion of such a level-wind mechanism.

Although the aforementioned example of the present invention utilizes a combination of gears and connection joints, it may alternately be driven via any combination of gears (spur, helical, bevel, worm, miter, etc.), chains, belts, ropes, cables, cords, bead chains, slew drives, winches or winch drives, crawler drives, wheel drives, aerator drives, pump drives, hydraulic drives, electric drives, electric motors, battery powered drives, etc. and the design and/or sequence may vary without straying from the spirit or purview of the present invention.

It should be noted that the figures described herein depict a mechanism wherein the spool chassis 13 is revolved 90-degrees "counter-clockwise" (relative to the plane of the upper and lower drive support arms 15 and 17) when switching from the line retrieval to the line casting position, this same function may be achieved by mirroring the orientation of the spool chassis 13 (and therefore the spool 37) such that it requires a "clockwise" rotation of the spool chassis 13 to switch from the line retrieval position to the casting position. Additionally, it is possible to alter the vertical axis of rotation (as formed by vertical pins 87 and 89) upon which the spool chassis 13 rotates 90-degrees within the upper and lower drive support arms 15 and 17 of the main-body chassis 5 such that it becomes a horizontal axis of rotation. In this scenario, the upper and lower drive support arms 15 and 17, and therefore vertical pins 87 and 89, are arranged in a horizontal fashion such that the spool chassis 13 is capable of 90-degree rotation about a horizontal axis. In each case, the same effects are achieved as the examples described herein and these modifications do not deviate from scope of the original invention, and therefore, should be included in the purview of the attached claims.

The foregoing disclosure is the applicant's description of the best mode in which to practice this invention. Fishing reels incorporating modifications and variations will become obvious to one skilled in the fishing reel art. While the foregoing disclosure is intended for one skilled in the pertinent art to practice the invention, it should not be construed as being limited thereby. Instead the present invention should be construed to include any obvious variations and be limited only by the spirit and scope of the following claims.

What is claimed is:

1. A convertible chassis fishing reel with rotatable spool chassis for selective line casting and retrieval comprising:
   a) a main-body chassis comprising a reel drive having an anti-reverse mechanism, a pivot mount, and a main body chassis mount;
   b) a spool chassis comprising a spool mounting mechanism for receiving a spool, wherein said spool chassis is pivotally connected to said pivot mount at a pivot point; wherein said spool chassis can be selectively rotated between a first position and a second position; wherein the orientation of said spool chassis in said first position is substantially perpendicular to the orientation of said spool chassis about said pivot point in said second position; wherein said reel drive communicates through said pivot point with said spool mounting mechanism for causing said spool mounting mechanism to rotate;
   c) a spool, removably attached to said spool mounting mechanism, wherein said spool rotates within said spool chassis when driven by said reel drive;
   d) a crank handle in communication with said reel drive;
   e) a level wind mechanism operably connected to said spool chassis; wherein said level wind mechanism is in communication with said reel drive; and
   f) an adjustable drag assembly, operably connected to said spool chassis, wherein said drag assembly comprises a drag lever arm, a drag preset knob, and a free spool tension adjustment knob.

2. The convertible chassis fishing reel according to claim 1, wherein said pivot mount comprises at least one support arm, and said reel drive communicates through the pivot point of at least one of said support arm.

3. The convertible chassis fishing reel according to claim 1, wherein said spool chassis is oriented parallel to a direction of line retrieval in said first position and oriented perpendicular to the direction of line retrieval in said second position.

4. The convertible chassis fishing reel according to claim 1, wherein said reel drive communicates with said spool mounting mechanism by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

5. A convertible chassis fishing reel with rotatable spool chassis for selective line casting and retrieval comprising:
   a) a main-body chassis comprising a reel drive having an anti-reverse mechanism, at least one support arm, and a main-body chassis mount;
   b) a spool chassis comprising a spool mounting mechanism for receiving a spool, wherein said spool chassis is pivotally connected to said at least one support arm at a pivot point; wherein said spool chassis can be selectively rotated between a first position and a second position; wherein the orientation of said spool chassis in said first position is substantially perpendicular to the orientation of said spool chassis in said second position; wherein said reel drive communicates through said pivot point of said at least one support arm of said reel drive to said spool mounting mechanism for causing the spool to rotate within said spool chassis;
   c) a spool, removably attached to said spool mounting mechanism, wherein said spool rotates within said spool chassis when driven by said reel drive;
   d) a crank handle in communication with said reel drive;
   e) a level wind mechanism operably connected to said spool chassis; wherein said level wind mechanism is in communication with said reel drive; and
   f) an adjustable drag assembly, operably connected to said spool chassis, wherein said drag assembly comprises a drag lever arm, a drag preset knob, and a free spool tension adjustment knob.

6. The convertible chassis fishing reel according to claim 5, wherein said spool chassis is oriented parallel to a direction of line retrieval in said first position and oriented perpendicular to the direction of line retrieval in said second position.

7. The convertible chassis fishing reel according to claim 5, wherein said reel drive communicates with said spool mounting mechanism by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

8. In a convertible chassis fishing reel with a main-body chassis and a spool mounted to a spool mounting chassis which is pivotally connected to said main-body chassis through a pivot mount which intersects the axle of the spool at a point disposed within said spool, a method for selective line casting and retrieval comprising:
   a) orienting a rotational axis of said spool in a first direction parallel to a direction of line dispensing from said spool;
   b) dispensing line from said spool;
   c) orienting said rotational axis of said spool in a second direction for retrieval of said line on said spool, said second direction substantially perpendicular said first direction;
   d) rotating said spool oriented in said second direction for retrieving said line on said spool; and
   e) wherein step (d) further comprises applying a force through said pivot mount for causing a rotation of said spool.

9. A convertible chassis fishing reel with rotatable spool chassis for selective line casting and retrieval comprising:
   a) a main-body chassis comprising a reel drive, a pivot mount, and a main body chassis mount;
   b) a spool chassis comprising an axle for receiving a spool, wherein said spool chassis is pivotally connected to said pivot mount at a pivot point; wherein said spool chassis can be selectively rotated between a first position and a second position; wherein the orientation of said spool chassis in said first position is substantially perpendicular to the orientation of said spool chassis about said pivot point in said second position; wherein said reel drive communicates through said pivot point with said spool for causing said spool to rotate.

10. The convertible chassis fishing reel according to claim 9, further comprising a level-wind mechanism.

11. The convertible chassis fishing reel according to claim 9, further comprising an adjustable drag assembly operably connected to said spool chassis.

12. The convertible chassis fishing reel of claim 9, further comprising a crank handle, wherein said crank handle is removably affixed to said reel drive.

13. The convertible chassis fishing reel of claim 9, wherein said reel drive comprises an anti-reverse mechanism.

14. The convertible chassis fishing reel according to claim 9, wherein said pivot mount comprises at least one support arm, and said reel drive communicates through the pivot point of at least one of said support arm.

15. The convertible chassis fishing reel according to claim 9, wherein said axle of said spool chassis is oriented parallel to a direction of line retrieval in said first position and oriented perpendicular to the direction of line retrieval in said second position.

16. The convertible chassis fishing reel according to claim 9, wherein said reel drive communicates with said spool by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

17. The convertible chassis fishing reel according to claim 9, further comprising a spool mounting mechanism to which said spool is removably attached to said spool mounting mechanism, wherein said spool rotates within said spool chassis when driven by said reel drive.

18. A convertible chassis fishing reel with rotatable spool chassis for selective line casting and retrieval comprising:
  a) a main-body chassis comprising a reel drive, at least one support arm, and a main-body chassis mount;
  b) a spool chassis comprising an axle for receiving a spool, wherein said spool chassis is pivotally connected to said at least one support arm at a pivot point; wherein said spool chassis can be selectively rotated between a first position and a second position; wherein the orientation of said spool chassis in said first position is substantially perpendicular to the orientation of said spool chassis in said second position; wherein said reel drive communicates through said pivot point of said at least one support arm of said reel drive to said spool for causing said spool to rotate within said spool chassis.

19. The convertible chassis fishing reel according to claim 18 further comprising a level-wind mechanism operably connected to said spool chassis.

20. The convertible chassis fishing reel according to claim 19, wherein said level-wind mechanism is in communication with said reel drive.

21. A convertible chassis fishing reel with rotatable spool chassis for selective line casting and retrieval comprising:
  a) a main-body chassis comprising a reel drive, at least one support arm, and a main-body chassis mount;
  b) a spool chassis comprising an axle for receiving a spool, wherein said spool chassis is pivotally connected to said at least one support arm at a pivot point; wherein said spool chassis can be selectively rotated between a first position and a second position; wherein the orientation of said spool chassis about said pivot point in said first position is substantially perpendicular to the orientation of said spool chassis about said pivot point in said second position; wherein said reel drive communicates through said pivot point of said at least one support arm to said spool such that the spool rotates within said spool chassis; and
  c) an adjustable drag assembly operably connected to said spool chassis.

22. The convertible chassis fishing reel according to claim 21, wherein said adjustable drag assembly further comprises a drag lever arm.

23. The convertible chassis fishing reel according to claim 21, wherein said adjustable drag assembly further comprises a drag-preset mechanism.

24. The convertible chassis fishing reel according to claim 21, wherein said spool chassis further comprises a free spool tension adjusting mechanism.

25. A convertible chassis fishing reel with rotatable spool chassis for selective line casting and retrieval comprising:
  a) a main-body chassis comprising a reel drive, at least one support arm, and a main-body chassis mount;
  b) a spool chassis comprising an axle for receiving a spool, wherein said spool chassis is pivotally connected to said at least one support arm at a pivot point; wherein said spool chassis can be selectively rotated between a first position and a second position; wherein the orientation of said spool chassis about said pivot point in said first position is substantially perpendicular to the orientation of said spool chassis about said pivot point in said second position; wherein said reel drive communicates through said pivot point of said at least one support arm to said spool mounting mechanism such that the spool rotates within said spool chassis;
  c) a spool mounting mechanism to which said spool is removably attached to said spool mounting mechanism, wherein said spool rotates within said spool chassis when driven by said reel drive;
  d) a crank handle in communication with said reel drive;
  e) a level wind mechanism; and
  f) an adjustable drag assembly.

26. The convertible chassis fishing reel of claim 25, wherein said crank handle is removably affixed to said reel drive.

27. The convertible chassis fishing reel according to claim 25, wherein said reel drive comprises an anti-reverse mechanism.

28. The convertible chassis fishing reel according to claim 25, wherein said level-wind mechanism is operably connected to said spool chassis and in communication with said reel drive.

29. The convertible chassis fishing reel according to claim 25, wherein said adjustable drag assembly is in communication with said spool.

30. The convertible chassis fishing reel according to claim 25, wherein said adjustable drag assembly is operably connected to said spool chassis.

31. The convertible chassis fishing reel according to claim 25, wherein said reel drive communicates with said spool by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

32. A convertible chassis fishing reel for selective line casting and retrieval comprising:

a) a main-body chassis comprising a pivot mount and a main-body chassis mount;

b) a spool chassis comprising a spool mounting mechanism, said spool chassis pivotally connected to said main body chassis at said pivot mount; said spool mounting mechanism defining a spool rotation axis; said spool chassis selectively rotatable between a first position and a second position, said orientation of said spool rotation axis in said first position substantially perpendicular to said orientation of said spool rotation axis in said second position; and c) a reel drive connected to said main-body chassis, said reel drive operatively communicating with said spool mounting mechanism through said pivot mount for causing rotation of said spool mounting mechanism.

33. In a convertible chassis fishing reel with a main-body chassis and a spool mounted to a spool mounting chassis which is pivotally connected to said main-body chassis through a pivot mount, a method for selective line casting and retrieval comprising:

a) orienting a rotational axis of said spool in a first direction parallel to a direction of line dispensing from said spool;

b) dispensing line from said spool;

c) orienting said rotational axis of said spool in a second direction for retrieval of said line on said spool, said second direction substantially perpendicular to said first direction;

d) rotating said spool oriented in said second direction for retrieving said line on said spool;

e) wherein step (d) further comprises applying a force through said pivot mount for causing a rotation of said spool.

34. A convertible chassis fishing reel with rotatable spool chassis for selective line casting and retrieval comprising:

a) a main-body chassis;

b) a spool chassis rotatably connected to the main-body chassis, wherein said spool chassis comprises an axle for receiving a spool, and wherein said spool chassis can be selectively rotated between a first position and a second position along an axis of rotation which is substantially perpendicular to said axle and which intersects said axle at a point disposed within said spool, and wherein said spool chassis is rotatably connected to said main-body chassis through a pivot mount and a reel drive communicates with said spool through said pivot mount causing said spool to rotate about said axle.

35. The convertible chassis fishing reel according to claim 34, further comprising a reel drive.

36. The convertible chassis fishing reel according to claim 35, wherein said reel drive communicates with said spool causing said spool to rotate about said axle.

37. The convertible chassis fishing reel according to claim 35, further comprising a crank handle removably affixed to said reel drive.

38. The convertible chassis fishing reel according to claim 35, wherein said reel drive comprises an anti-reverse mechanism.

39. The convertible chassis fishing reel according to claim 35, wherein said reel drive communicates with said spool by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

40. The convertible chassis fishing reel according to claim 34, wherein said pivot mount comprises at least one support arm.

41. The convertible chassis fishing reel according to claim 34, wherein said axle in said first position is parallel to a direction of line retrieval and said axle in said second position is perpendicular to the direction of line retrieval.

42. The convertible chassis fishing reel according to claim 34, further comprising a spool removably attached to said axle.

43. The convertible chassis fishing reel according to claim 34, further comprising a level-wind mechanism operably connected to said spool chassis.

44. The convertible chassis fishing reel according to claim 43 wherein said level-wind mechanism is in communication with a reel drive.

45. The convertible chassis fishing reel according to claim 34, further comprising an adjustable drag assembly operably connected to said spool chassis.

46. A convertible chassis fishing reel with rotatable spool chassis for selective line casting and retrieval comprising:

a) a main-body chassis comprising a reel drive, at least one support arm, and a main-body chassis mount;

b) a spool chassis comprising a spool mounting mechanism for receiving a spool, wherein said spool chassis is pivotally connected to said at least one support arm at a pivot point; wherein said spool chassis can be selectively rotated between a first position and a second position; wherein the orientation of said spool chassis about said pivot point in said first position is substantially perpendicular to the orientation of said spool chassis about said pivot point in said second position; wherein said reel drive communicates through said pivot point of said at least one support arm to said spool mounting mechanism such that the spool rotates within said spool chassis; and c) an adjustable drag assembly operably connected to said spool chassis.

47. The convertible chassis fishing reel according to claim 46, wherein said adjustable drag assembly further comprises a drag lever arm.

48. The convertible chassis fishing reel according to claim 46, wherein said adjustable drag assembly further comprises a drag-preset mechanism.

49. The convertible chassis fishing reel according to claim 46, wherein said spool chassis further comprises a free spool tension adjusting mechanism.

50. A convertible chassis fishing reel with rotatable spool chassis for selective line casting and retrieval comprising:

a) a main-body chassis comprising a reel drive, at least one support arm, and a main-body chassis mount;

b) a spool chassis comprising a spool mounting mechanism for receiving a spool, wherein said spool chassis is pivotally connected to said at least one support arm at a pivot point; wherein said spool chassis can be selectively rotated between a first position and a second position; wherein the orientation of said spool chassis about said pivot point in said first position is substantially perpendicular to the orientation of said spool chassis about said pivot point in said second position; wherein said reel drive communicates through said pivot point of said at least one support arm to said spool mounting mechanism such that the spool rotates within said spool chassis;

c) a spool removably attached to said spool mounting mechanism, wherein said spool rotates within said spool chassis when driven by said reel drive;

d) a crank handle in communication with said reel drive;

e) a level wind mechanism; and f) an adjustable drag assembly.

51. The convertible chassis fishing reel of claim 50, wherein said crank handle is removably affixed to said reel drive.

52. The convertible chassis fishing reel according to claim 50, wherein said reel drive comprises an anti-reverse mechanism.

53. The convertible chassis fishing reel according to claim 50, wherein said level-wind mechanism is operably connected to said spool chassis and in communication with said reel drive.

54. The convertible chassis fishing reel according to claim 50, wherein said adjustable drag assembly is in communication with said spool.

55. The convertible chassis fishing reel according to claim 50, wherein said adjustable drag assembly is operably connected to said spool chassis.

56. The convertible chassis fishing reel according to claim 50, wherein said reel drive communicates with said spool mounting mechanism by a drive system selected from the group consisting of chains, sprockets, gears, belts, cables, cords, bead chains, ropes, slew drives, winches, winch drives, crawler drives, wheel drives, aerator drives, pump drives, hydraulic drives, fluid drives, turbines, electric drives, electric motors, and battery drives.

57. A convertible chassis fishing reel for selective line casting and retrieval comprising:

a) a main-body chassis comprising a pivot mount and a main-body chassis mount;

b) a spool chassis comprising a spool mounting mechanism, said spool chassis pivotally connected to said main body chassis at said pivot mount; said spool mounting mechanism defining a spool rotation axis; said spool chassis selectively rotatable between a first position and a second position, said orientation of said spool rotation axis in said first position substantially perpendicular to said orientation of said spool rotation axis in said second position; and c) a reel drive connected to said main-body chassis, said reel drive operatively communicating with said spool mounting mechanism through said pivot mount for causing rotation of said spool mounting mechanism.

* * * * *